US012650861B1

(12) United States Patent　(10) Patent No.: US 12,650,861 B1
Simon　(45) Date of Patent: Jun. 9, 2026

(54) TARGETED GRAPHICAL USER INTERFACE LAYOUT OPTIMIZER USING RESOURCE OBJECT PRIORITIZATION

(71) Applicant: The Huntington National Bank, Columbus, OH (US)

(72) Inventor: Tyler Simon, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/423,573

(22) Filed: Dec. 17, 2025

(51) Int. Cl.
　*G06F 9/451* (2018.01)
　*G06F 16/3329* (2025.01)
(52) U.S. Cl.
　CPC ........ *G06F 9/451* (2018.02); *G06F 16/33295* (2025.01)
(58) Field of Classification Search
　CPC ........................... G06F 9/451; G06F 16/33295
　See application file for complete search history.

(56) References Cited

U.S. PATENT DOCUMENTS

| | | | |
|---|---|---|---|
| 12,020,045 B1 * | 6/2024 | Wilson | G06F 9/44521 |
| 2023/0245651 A1 * | 8/2023 | Wang | G06N 5/022 |
| | | | 704/275 |
| 2025/0036434 A1 * | 1/2025 | Madison | G06F 9/451 |
| 2025/0298633 A1 * | 9/2025 | McPeak | G06F 9/44505 |

| | | | |
|---|---|---|---|
| 2025/0315859 A1 * | 10/2025 | Gupta | G06Q 30/0202 |
| 2025/0348925 A1 * | 11/2025 | Kulkarni | G06N 20/00 |
| 2025/0371057 A1 * | 12/2025 | Malleshaiah | G06F 16/33295 |

OTHER PUBLICATIONS

"How AI is transforming the rewards and incentive industry in the US", taken from https://www.edgardunn.com/articles/how-ai-is-transforming-the-rewards-and-incentive-industry-in-the-US, published Apr. 2, 2024, 13 pages (Year: 2024).*

* cited by examiner

*Primary Examiner* — William L Bashore
*Assistant Examiner* — Gregory A Distefano
(74) *Attorney, Agent, or Firm* — Kilpatrick Townsend & Stockton LLP

(57) ABSTRACT

Techniques are provided for activating resource objects, optimizing graphical user interface (GUI) layouts using object prioritization. A natural language query is received from an edge device associated with a first entity, where the device is linked to a first account containing at least one transferrable resource. The query is provided as input to a generative model, which generates request context metadata based on a similarity score and historical account data. The context metadata and a portion of the query are supplied to the generative model to refine the response. A set of interactable objects is selected based on the model's output, each associated with resource objects and offset resources. Upon receiving a user selection of an interactable object, the system activates the corresponding resource object, facilitates transfer of the transferrable resource to a second account, and applies the offset resource to the first account, enabling context-aware, personalized user interactions.

20 Claims, 8 Drawing Sheets

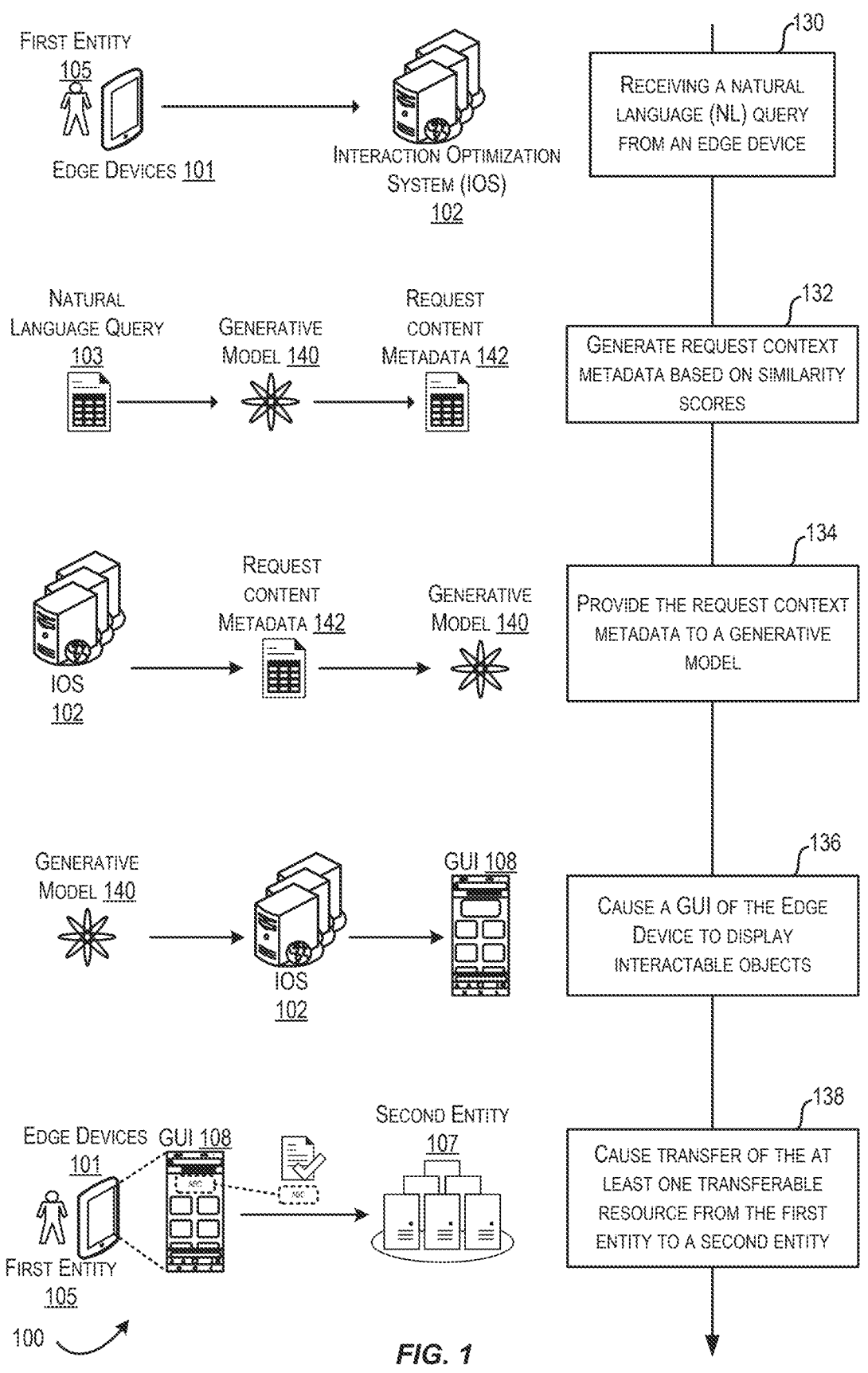

FIRST ENTITY
105
EDGE DEVICES 101

INTERACTION OPTIMIZATION SYSTEM (IOS)
102

130
RECEIVING A NATURAL LANGUAGE (NL) QUERY FROM AN EDGE DEVICE

NATURAL LANGUAGE QUERY
103
GENERATIVE MODEL 140
REQUEST CONTENT METADATA 142

132
GENERATE REQUEST CONTEXT METADATA BASED ON SIMILARITY SCORES

IOS
102
REQUEST CONTENT METADATA 142
GENERATIVE MODEL 140

134
PROVIDE THE REQUEST CONTEXT METADATA TO A GENERATIVE MODEL

GENERATIVE MODEL 140
IOS
102
GUI 108

136
CAUSE A GUI OF THE EDGE DEVICE TO DISPLAY INTERACTABLE OBJECTS

EDGE DEVICES GUI 108
101
FIRST ENTITY
105
SECOND ENTITY
107

138
CAUSE TRANSFER OF THE AT LEAST ONE TRANSFERABLE RESOURCE FROM THE FIRST ENTITY TO A SECOND ENTITY

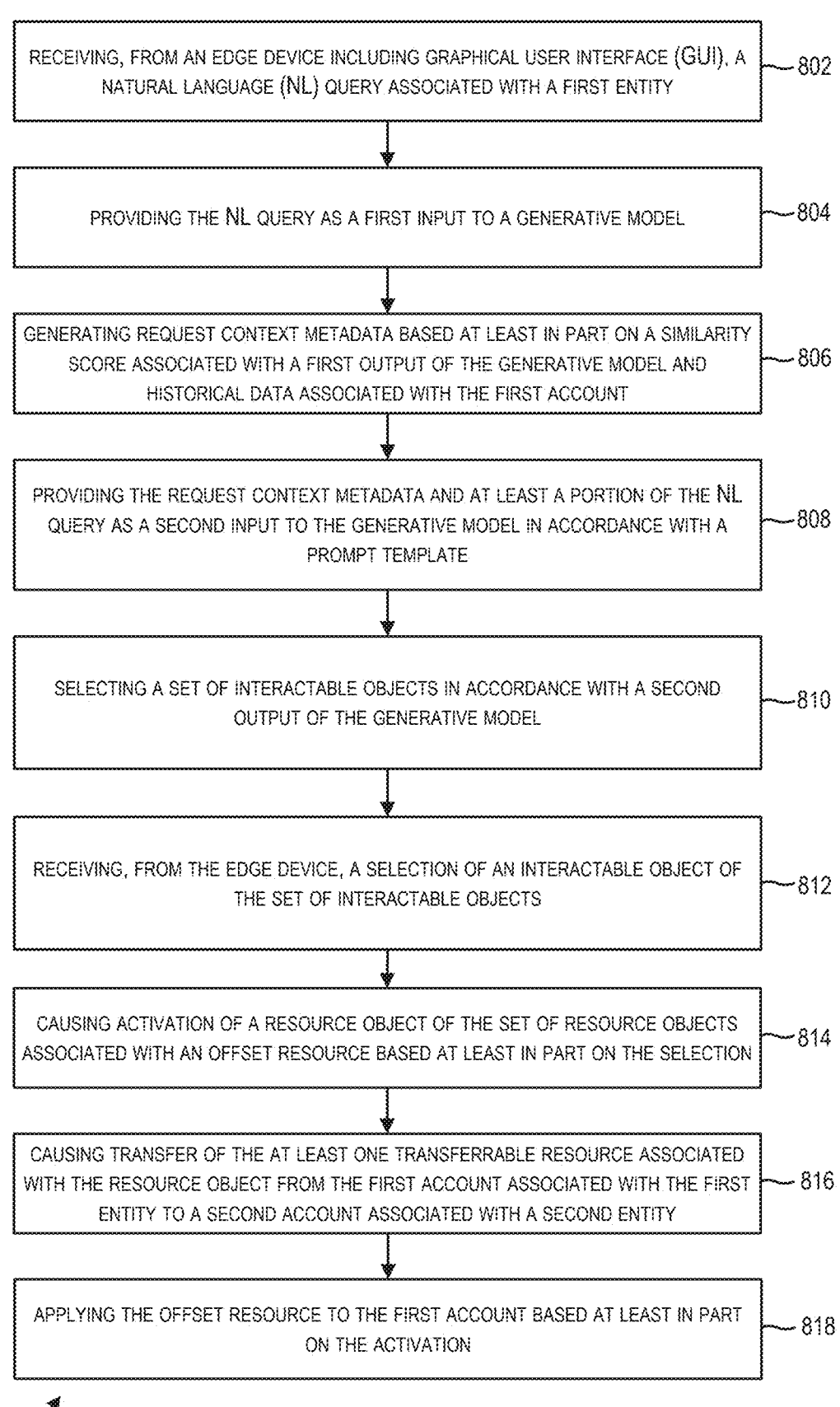

RECEIVING, FROM AN EDGE DEVICE INCLUDING GRAPHICAL USER INTERFACE (GUI), A NATURAL LANGUAGE (NL) QUERY ASSOCIATED WITH A FIRST ENTITY ⟶ 802

PROVIDING THE NL QUERY AS A FIRST INPUT TO A GENERATIVE MODEL ⟶ 804

GENERATING REQUEST CONTEXT METADATA BASED AT LEAST IN PART ON A SIMILARITY SCORE ASSOCIATED WITH A FIRST OUTPUT OF THE GENERATIVE MODEL AND HISTORICAL DATA ASSOCIATED WITH THE FIRST ACCOUNT ⟶ 806

PROVIDING THE REQUEST CONTEXT METADATA AND AT LEAST A PORTION OF THE NL QUERY AS A SECOND INPUT TO THE GENERATIVE MODEL IN ACCORDANCE WITH A PROMPT TEMPLATE ⟶ 808

SELECTING A SET OF INTERACTABLE OBJECTS IN ACCORDANCE WITH A SECOND OUTPUT OF THE GENERATIVE MODEL ⟶ 810

RECEIVING, FROM THE EDGE DEVICE, A SELECTION OF AN INTERACTABLE OBJECT OF THE SET OF INTERACTABLE OBJECTS ⟶ 812

CAUSING ACTIVATION OF A RESOURCE OBJECT OF THE SET OF RESOURCE OBJECTS ASSOCIATED WITH AN OFFSET RESOURCE BASED AT LEAST IN PART ON THE SELECTION ⟶ 814

CAUSING TRANSFER OF THE AT LEAST ONE TRANSFERRABLE RESOURCE ASSOCIATED WITH THE RESOURCE OBJECT FROM THE FIRST ACCOUNT ASSOCIATED WITH THE FIRST ENTITY TO A SECOND ACCOUNT ASSOCIATED WITH A SECOND ENTITY ⟶ 816

APPLYING THE OFFSET RESOURCE TO THE FIRST ACCOUNT BASED AT LEAST IN PART ON THE ACTIVATION ⟶ 818

TARGETED GRAPHICAL USER INTERFACE LAYOUT OPTIMIZER USING RESOURCE OBJECT PRIORITIZATION

BACKGROUND

Modern software applications and digital platforms increasingly rely on presenting users with a range of options, selections, or content items in response to user queries or contextual data. As the capabilities of devices and backend systems have grown, the amount of information and possible actions offered to users has expanded significantly. While this can provide users with more choices, it often results in information overload. In scenarios where users must make quick decisions or interact with applications in time-sensitive situations, the abundance of options presented without effective filtering or prioritization can lead to confusion, indecision, and inefficiency.

BRIEF SUMMARY

Techniques are provided for graphical user interface layout optimizing using resource object prioritization. Various embodiments are described herein, including methods, systems, non-transitory computer-readable storage media storing programs, code, or instructions executable by one or more processors, and the like.

According to various embodiments, a computer-implemented method may involve receiving, from an edge device including graphical user interface (GUI), a natural language (NL) query associated with a first entity. The edge device may be associated with a first account of the first entity that contains at least one transferrable resource. The NL query may be provided as a first input to a generative model, with the first input including instructions requesting a prompt template based at least in part on the first account. Request context metadata may be generated based at least in part on a similarity score associated with a first output of the generative model and historical data associated with the first account, with the first output based at least in part on the generative model processing the first input. The request context metadata and at least a portion of the NL query may be provided as a second input to the generative model in accordance with the prompt template. A set of interactable objects may be selected in accordance with a second output of the generative model, with the set of interactable objects associated with a set of resource objects that facilitate access to the at least one transferrable resource, and the set of resource objects associated with a set of offset resources, and the second output may be based at least in part on the generative model processing the second input. A selection of an interactable object of the set of interactable objects may be received from the edge device. Activation of a resource object of the set of resource objects associated with an offset resource may be caused based at least in part on the selection. Transfer of the at least one transferrable resource associated with the resource object from the first account associated with the first entity to a second account associated with a second entity may be caused, and the offset resource may be applied to the first account based at least in part on the activation.

According to various embodiments, a computing device may include one or more processors and one or more memories storing computer-executable instructions that, when executed by the one or more processors, may cause the one or more processors to receive, from an edge device including graphical user interface (GUI), a natural language (NL) query associated with a first entity. The edge device may be associated with a first account of the first entity that contains at least one transferrable resource. The NL query may be provided as a first input to a generative model, with the first input including instructions requesting a prompt template based at least in part on the first account. Request context metadata may be generated based at least in part on a similarity score associated with a first output of the generative model and historical data associated with the first account, with the first output based at least in part on the generative model processing the first input. The request context metadata and at least a portion of the NL query may be provided as a second input to the generative model in accordance with the prompt template. A set of interactable objects may be selected in accordance with a second output of the generative model, with the set of interactable objects associated with a set of resource objects that facilitate access to the at least one transferrable resource, and the set of resource objects associated with a set of offset resources. The second output may be based at least in part on the generative model processing the second input. A selection of an interactable object of the set of interactable objects may be received from the edge device. Activation of a resource object of the set of resource objects associated with an offset resource may be caused based at least in part on the selection. Transfer of the at least one transferrable resource associated with the resource object from the first account associated with the first entity to a second account associated with a second entity may be caused, and the offset resource may be applied to the first account based at least in part on the activation.

According to various embodiments, a non-transitory computer-readable storage medium may store computer-executable instructions that, when executed with one or more processors of a computing device, may cause the one or more processors to receive, from an edge device including graphical user interface (GUI), a natural language (NL) query associated with a first entity. The edge device may be associated with a first account of the first entity that contains at least one transferrable resource. The NL query may be provided as a first input to a generative model, with the first input including instructions requesting a prompt template based at least in part on the first account. Request context metadata may be generated based at least in part on a similarity score associated with a first output of the generative model and historical data associated with the first account, with the first output based at least in part on the generative model processing the first input. The request context metadata and at least a portion of the NL query may be provided as a second input to the generative model in accordance with the prompt template. A set of interactable objects may be selected in accordance with a second output of the generative model, with the set of interactable objects associated with a set of resource objects that facilitate access to the at least one transferrable resource, and the set of resource objects associated with a set of offset resources. The second output may be based at least in part on the generative model processing the second input. A selection of an interactable object of the set of interactable objects may be received from the edge device. Activation of a resource object of the set of resource objects associated with an offset resource may be caused based at least in part on the selection. Transfer of the at least one transferrable resource associated with the resource object from the first account associated with the first entity to a second account associated with a second entity may be caused, and the offset resource may be applied to the first account based at least in part on the activation.

According to various embodiments, request context metadata may include historical data associated with the first account, and the historical data may be populated in accordance with the prompt template.

According to various embodiments, a GUI parameter associated with the GUI of the edge device may be determined. A target GUI layout for the GUI of the edge device may be generated that includes a subset of interactable objects of the set of interactable objects in accordance with a threshold condition associated with the GUI parameter. The GUI of the edge device may be caused to display the subset of interactable objects in accordance with the target GUI layout. Determining the GUI parameter may include determining at least one of an orientation of the edge device, a resolution of the edge device, a screen size of the edge device, or an accessibility setting of the edge device.

According to various embodiments, generating the target GUI layout for the GUI may include determining at least one of scaling, positioning, and arranging of the subset of interactable objects based at least in part on the GUI parameter.

According to various embodiments, a physical location of the edge device may be determined, and generating the target GUI layout may be based at least in part on the physical location.

According to various embodiments, the threshold condition may be determined based at least in part on a determined usable area of the GUI.

According to various embodiments, the similarity score may be generated based at least in part on comparing the NL query to historical data associated with the first account.

BRIEF DESCRIPTION OF THE DRAWINGS

Various embodiments in accordance with the present disclosure will be described with reference to the drawings, in which:

FIG. 1 is a simplified flow diagram of an example graphical user interface layout optimization process using resource object prioritization, according to certain embodiments;

FIG. 8 is a simplified diagram of an example method for resource object identification and activation, according to certain embodiments.

Figure 2:
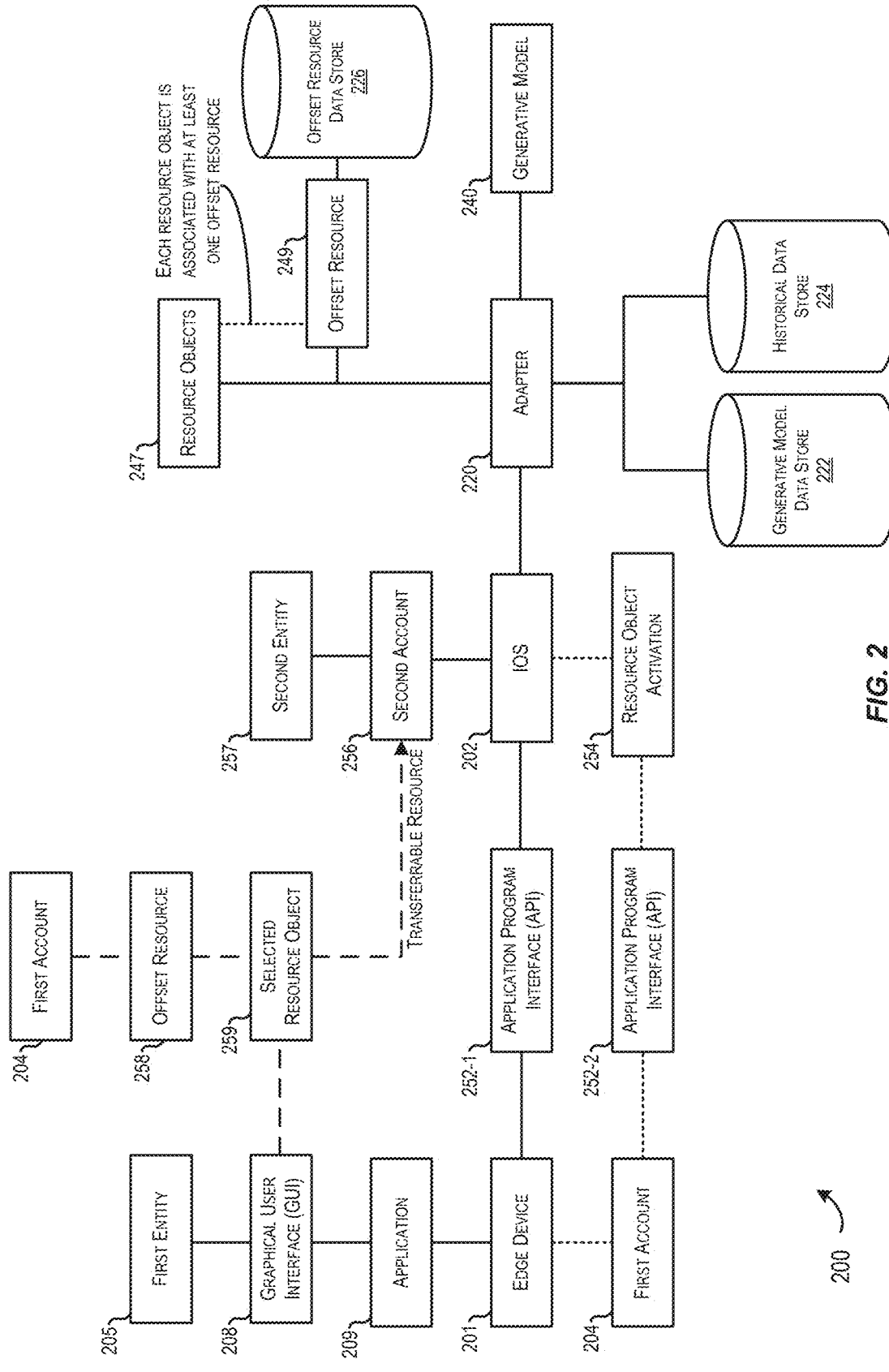
FIG. 2 is a simplified block diagram of example system that optimizes graphical user interfaces using resource object prioritization, according to certain embodiments.

The foregoing aspects and many of the advantages of the present disclosure will become more readily appreciated as these advantages become better understood by reference to the following detailed description, when taken in conjunction with the accompanying drawings.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some or all of the process (or any other processes described herein, or variations, and/or combinations thereof) may be performed under the control of one or more computer systems configured with executable instructions, and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Many digital applications endeavor to help users efficiently select from sets of available options, such as choosing a device to control, a task to initiate, or a resource to access, by using conversational interfaces powered by generative models. These applications often receive user requests in natural language, which is everyday spoken or written input that allows people to communicate with technology in a more intuitive manner. In this context, a natural language (NL) query refers to a user's spoken or typed question or request, for example, "Show me which lights are on in the living room." To interpret these queries, the system may use a generative model, which is a form of artificial intelligence designed to process and produce text, understand context, and formulate relevant outputs in response to user input. The graphical user interface (GUI) includes the visual elements on a device's screen, such as icons, lists, and buttons, which users interact with to make selections or view information. A resource object may represent any data item or access token that allows a user to interact with a device or trigger an action, while an offset resource may refer to an additional data item or benefit that is applied to a user's account as a result of an interaction, such as earning a digital badge or unlocking new device functionality, for example. A transferrable resource can mean a unit of data, access, or functionality that can be moved or shared between accounts or devices within the system.

Conventional devices and software platforms continue to struggle with presenting manageable sets of options to users, particularly when important contextual information such as device screen size, user history, or time constraints is not considered. For example, mobile devices or smart home control panels with limited display areas may present too many device controls or status options at once, forcing users to scroll or navigate through multiple screens, which can be cumbersome, confusing, and time consuming. Many current systems lack an ability to dynamically filter or prioritize options based on the real-time context of the user, resulting in the user being presented with excessive or irrelevant information. In time-pressured situations, such as a user quickly seeking to adjust several IoT devices before leaving home or managing environmental controls in a hospital room from a tablet, the inability of existing systems to intelligently narrow down options according to the user's context or device constraints can lead to frustration, delays, and reduced effectiveness.

Embodiments described herein address these technical problems by implementing a method that receives a natural language query from an edge device, such as a smartphone, tablet, or IoT control panel, where the edge device is associated with a user account containing at least one transferrable resource. The natural language query is provided as input to a generative model, which processes the request and generates context metadata, including a similarity score that is determined with reference to historical data for the user's account. This metadata, along with at least a portion of the NL query, may then be used as further input to the generative model to refine the response. The generative model may select a set of interactable objects, each linked to resource objects that enable access to transferrable resources and offset resources. The system may then determine GUI parameters, which may include screen resolution, orientation, and/or accessibility settings of the GUI at the time of the NL query, and generates a GUI layout that displays only a subset of the interactable objects according to a threshold condition based on those GUI parameters. The user can then make a selection from the displayed options, which triggers activation of the corresponding resource object and offset resource, and the system controls transfer of the transferrable resource between accounts as well as application of the offset resource.

When determining which interactable objects to present and highlight within the GUI, the system may apply sorting or prioritization techniques that consider both historical patterns of user interaction and the relative utility of each offset resource linked to a resource object. For example, the system may analyze the user's previous choices and engagement with resource objects in order to infer preferences or predict future selections. The offset resource associated with each resource object is also evaluated, with higher-value offset resources, such as those offering greater enhancement, access, or benefit, given preference in the ranking. By combining these factors, the system can arrange the subset of interactable objects so that those most likely to deliver the greatest overall value to the user, based on both learned past behavior and present utility, appear more prominently or are more easily accessible within the GUI. This sorting mechanism helps users identify and select the resource object that best matches their needs or maximizes their benefit, streamlining the decision process and improving the user experience, especially in situations where only a limited number of options can be displayed due to device constraints.

This system provides several technical advantages by adapting both the number and arrangement of displayed options to the specific attributes of the user's edge device, such as screen width, orientation, resolution and/or accessibility features, the system prevents information overload and improves usability. The use of multi-stage generative model processing ensures that both the user's context and user history are considered in light of a present task the user is attempting to complete, resulting in more relevant and useful options. The system supports real-time filtering and selection, which allows for rapid, context-sensitive decision-making even when the edge device has limited display capabilities. Secure management of resource objects and offset resources helps ensure that interactions are efficient and traceable, supporting features such as unlocking new device capabilities, granting digital rewards, and/or providing controlled access to resources. The described system brings improvements in how computing devices manage and present actionable options within GUIs. Through multi-stage generative model workflows, device-specific GUI adaptation, and/or secure resource management, the method solves technical challenges associated with option overload and inefficient user interfaces on resource-constrained devices. The system is well suited for use in areas such as smart home device management, healthcare routine coordination, educational resource planning, and broader IoT environments, for example.

FIG. 1 is a simplified flow diagram of an example graphical user interface layout optimization process 100 using resource object prioritization, according to certain embodiments. As described below, FIG. 1 depicts a sequence of steps a system follows to present entities with relevant and manageable set of options on a screen of an edge device (e.g., smartphone). For example, an entity may submit a natural language request using the edge device, such as typing or speaking a question into an application. The system interprets this request, referencing information about the entities past choices and preferences to better understand what options might be most useful or appealing. The system then identifies a set of possible options and filters the options based on their predicted value to the user and GUI parameters. To avoid overwhelming the user, the system takes into account the technical constraints of the edge device, including screen size, orientation, and accessibility settings like large font or high contrast mode, and determines how many options can be comfortably displayed at once. Using this information, the system generates a GUI that arranges only the top-ranked options in a clear and accessible format. The user selects from these choices, after which the system performs any necessary actions such as activating a reward, transferring a resource, or updating the user's account, and records the interaction for future reference and further personalization.

For example, at block 130, the process 100 may include receiving a natural language (NL) query 103 from an edge device 101. By way of a non-limiting example, the edge device 101 may be used by a first entity 105 in order to interface with an interaction optimization system (IOS) 102 by way of an application stored and/or accessible using the edge device 101. The NL query 103 may be received as a voice command, typed input, or other suitable textual entry using the GUI 108 of the edge device 101 (e.g., a spoken request captured by a microphone, a typed request using a virtual keyboard, or a gesture-based query). The IOS 102 may be configured to accept and parse a variety of NL query formats to support user interaction, including queries that reference specific resource objects or that seek recommendations for actions or settings. The system may also log contextual data with the NL query 103, such as the time of submission, device location, or current application state, to enrich downstream processing.

At block 132, the process 100 may include generating request context metadata based on similarity scores. For example, the NL query 103 may be passed to a generative model 140 to facilitate generating request content metadata 142. The generative model 140 may be trained to identify keywords within the NL query 103 that can be used to generate an appropriate prompt with historical information associated with the first entity 105. Once the appropriate prompt is generated by the generative model 140, the IOS 102 may populate the appropriate sections of the request content metadata 142 using historical data associated with an account of the first entity 105. In some embodiments, the request content metadata 142 may include not only direct matches to prior queries but also inferred preferences and behavioral patterns (e.g., frequency of selecting particular resource objects, typical time windows for interaction, or preferred device types). The similarity score may be determined using vector representations of the NL query 103 and previously stored user actions, allowing for nuanced matching even if the query phrasing differs from historical interactions. For instance, if the first entity 105 often selects resource objects with high offset resource values, the metadata may reflect a stronger weighting towards those objects in subsequent processing.

At block 134, the process 100 may include providing the request content metadata 142 to the generative model 140. By way of a non-limiting example, the generative model 140 may, based at least in part on the request content metadata 142, identify a set of resource objects that are associated with a set of offset resources, and generate an output that may or may not include an API object file (e.g., a JSON file) that includes instructions for displaying a subset of the resource objects of the set of resource objects. The generative model 140 may further incorporate real-time device context (e.g., geofencing to determine physical location of the edge device, or the first entity, with consent of the first entity) to refine the selection of resource objects (e.g., filtering out resource objects based on a current location of the first entity 105). The output may also include ranking information or sorting instructions, enabling the IOS 102 to display resource objects with the highest predicted benefit or relevance to the first entity 105 at more accessible locations within the GUI 108 (e.g., prioritizing resource objects with higher offset resource values or those most frequently selected in similar contexts).

At block 136, the process 100 may include causing a graphical user interface (GUI) 108 of the edge device 101 to display a set of interactable objects. For example, as mentioned with respect to block 134, the generative model 140 may provide the output that includes instructions that can be interpreted by the IOS 102 to cause the GUI 108 to display the interactable objects to the first entity 105. The IOS 102 may determine GUI parameters such as available screen space, edge device 101 orientation, and/or user-selected accessibility settings (e.g., large font mode) to decide how many interactable objects can be displayed without clutter or overlap. The interactable objects may be visually enhanced with indicators reflecting the associated offset resource value, such as icons, color gradients, or progress bars (e.g., a highlighted border for objects offering greater benefit). In some embodiments, the IOS 102 may adjust the arrangement or sorting of interactable objects as the edge device 101 context changes, such as when the user rotates the screen or modifies accessibility preferences. This ensures that the first entity 105 is always presented with the most relevant and actionable options in a manner that is optimized for the current device context.

At block 138, the process 100 may include causing transfer of at least one transferrable resource from the first entity 105 to a second entity 107. By way of a non-limiting example, the GUI 108 may display a targeted GUI layout that includes the subset of interactable objects that are positioned, sized, oriented, and displayed in accordance with a threshold condition. The first entity 105 may interact (e.g., tap) a desired interactable object of the subset of interactable objects. This causes the IOS 102 to activate an appropriate resource object associated with the interactable object, which has a respective offset resource. Upon activation, the IOS 102 may update the account of the first entity 105 to reflect a benefit provided by the offset resource (e.g., activating a feature, awarding a digital badge, or increasing a utility score). The IOS 102 may also initiate a secure transfer of the transferrable resource to the second entity 107, ensuring that permissions, access rights, or data are correctly updated in accordance with the system's protocols (e.g., synchronizing device state, updating logs, or confirming the transaction via notification). The entire interaction may be recorded for future analysis, allowing the system (or generative model 140) to further refine its recommendation and display logic in subsequent processes.

FIG. 2 is a simplified block diagram of example system 200 that optimizes graphical user interfaces using resource object prioritization, according to certain embodiments. By way of a example, a first entity 205, which may be a user, device owner, machine, or authorized agent, may interface with a GUI 208 of an application 209 that is stored and/or accessible on an edge device 201. The edge device 201 may include, but is not limited to, a smartphone, tablet, wearable device, or a dedicated IoT control panel (e.g., a smart home hub, a healthcare tablet at a hospital bedside, or a vehicle dashboard). The application 209 may be installed locally or accessed via a cloud-based platform (as discussed in more detail with respect to FIG. 6), and may manage communications, display options, and/or facilitate allocation of transferrable resources. In addition, or alternatively, the application 209 may enable the first entity 205 to communicate with a IOS 202, view options, and execute tasks through the GUI 208.

The application 209 may be linked to a first account 204, which digitally represents the first entity 205 and maintains control of transferrable resources associated with the first entity 205. These transferrable resources may include, without limitation, digital access tokens for devices, content unlocks, or configuration settings for IoT appliances. The first entity 205 may interface with an application program interface (API) 252-2 to set up the first account 204, registering devices, permissions, or preferences. For example, the first entity 205 may add a new smart light to their home network, register a profile for personalized learning modules, or configure access for healthcare routines. Once the first account 204 is established, the first entity 205 can submit a NL query using the application 209 via API 252-1, which forwards the NL query to the IOS 202. NL queries may be submitted as voice commands, typed input, or selections from a conversational interface. The IOS 202 may receive the NL query and correctly format the NL query, where desired, for further processing.

In various embodiments, the application 209 includes executable software, firmware, or a combination thereof that is stored on or accessible by the edge device 201. The application 209 may provide an interactive environment for the first entity 205 to enable access to IOS 202 features, account management, and/or communication with backend services (e.g., adapter 220). In some embodiments, the application 209 may include the GUI 208 that includes visual components such as menus, icons, lists, and/or interactable objects that facilitate entity input and selection (e.g., touch, voice, or gesture-based controls). The application 209 may support secure authentication and authorization mechanisms to associate the first entity 205 with a first account 204, maintain records of transferrable resources, and track entity preferences. Additionally, the application 209 may implement protocols for submitting NL queries, transmitting and receiving data via APIs 252-1 and 252-2, and rendering outputs received from IOS 202. The application 209 may aid in managing edge device-specific parameters, such as screen resolution, size, orientation accessibility settings, and/or available hardware capabilities, in order to optimize a presentation and selection of interactable objects. In some examples, the application 209 may log usage events, synchronize contextual data with remote servers, and support updates or customization to adapt to evolving requirements or entity needs (e.g., updating resource object catalogs, modifying layout templates, or activating resource objects).

As mentioned previously, the NL query 103 may be an entity-generated request submitted by the first entity 205 via the application 209 operating on the edge device 201. The NL query 103 may be entered in various formats, including but not limited to spoken commands captured by a microphone, textual input typed into a field, or selections made using touch, gesture, or other multimodal interfaces. The NL query 103 is designed to allow the first entity 205 to communicate intent or preferences in a conversational manner, rather than having rigidly structured commands. Upon receipt by the application 209, the NL query 103 may be pre-processed, by the IOS 202, to normalize text, detect language, and extract key terms or phrases relevant to the user's desired action (e.g., identifying resource objects to be used, specifying criteria for selection, or requesting information about offset resources). The NL query 103 is then transmitted, via the appropriate API 252-1, to the interaction optimization system (IOS) 202 for further analysis and processing. In some embodiments, metadata such as timestamp, device context, entity account information, and/or session state may be appended to the NL query 103 to provide subsequent interpretation and promote accurate context-aware response generation from the generative model 240.

The IOS 202 may relay the NL query to an adapter 220, which acts as a bridge between entity-facing applications and backend systems. The adapter 220 may determine from a generative model data store 222 a most appropriate generative model 240 (e.g., a generative model specialized in resource objects and entity behavior). The adapter 220 may submit the NL query to the generative model 240, which, in some embodiments, may return a prompt (e.g., a prompt template) that includes sections to be filled in with relevant context metadata to identify suitable resource objects on a subsequent pass to the generative model 240. For example, the adapter 220 may query a historical data store 224 to retrieve relevant historical information associated with the first entity 205. This may include records of previously selected resource objects 247, offset resources 249, controls, behaviors, or prior routines associated with the first entity 205. The adapter 220 may determine one or more similarity scores to determine which resource objects 247 have historically provided and/or will provide a greatest benefit or utility for the first entity 205.

According to some embodiments, the similarity scores may be quantitative or qualitative metrics generated by the IOS 202, adapter 220, and/or generative model 240 (or jury of generative models) to measure degrees of relevance or correspondence between a current NL query and historical data stored in the historical data store 224. Similarity scores may be used to identify which resource objects 247 are most likely to match the user's intent, preferences, and/or prior engagement patterns so that adaptive ranking and prioritization can be performed. In some embodiments, similarity scores may be calculated using NL processing techniques, such as embedding the NL query and historical queries into a vector space and determining a cosine similarity or Euclidean distance (e.g., if the first entity 205 submits "Show me high-value offset resources for my profile," and a historical query such as "What are the top offset resources for my account?" exists, the similarity score may be high, indicating close relevance). Similarity scores may also incorporate contextual parameters, such as edge device usage patterns, time of day, location of the edge device, or previous selections (e.g., if the first entity 205 frequently selects resource objects 247 associated with a particular offset resource at a particular location, queries submitted at that particular location may receive higher similarity scores for those resource objects 247).

The similarity score may include both exact and fuzzy matching techniques, using semantic analysis, keyword extraction, and/or entity behavior modeling (e.g., if the NL query 103 contains synonyms or related terms, the IOS 202 may still assign a high similarity score based on semantic proximity). In another example, similarity scores may be weighted to favor resource objects that have historically resulted in positive offset resource outcomes (e.g., resource objects 247 that previously led to a high valued offset resource 249, successful feedback, or increased/decreased entity engagement). Once determined, similarity scores may also be used to select, rank, and/or filter resource objects 247 and offset resources 249 for presentation within the GUI 208. Resource objects 247 with higher similarity scores may be displayed more prominently or prioritized in the interactable object subset (e.g., the top three objects with the highest similarity scores may be shown in a featured section). The similarity score may also be combined with threshold condition constraints and offset resource value to produce a composite ranking metric, ensuring that the first entity 205 is presented with options most likely to satisfy their current needs based on both historical behavior and present context. In some embodiments, similarity scores may be updated or refined in real-time as the user interacts with the IOS 202, allowing the application 209 and IOS 202 to continuously adapt recommendations and GUI 208 presentation logic (e.g., if the entity selects an object with a lower initial similarity score, the IOS 202 may adjust a weighting for future NL queries to better reflect changing preferences).

By way of a non-limiting example, an output from the generative model 240 may include a populatable prompt that is generated in response to the NL query 103 generated by the first entity 205. The generative model 240 may be implemented as a machine learning system, such as a large language model (LLM) or a context-aware neural network, trained to interpret user intent and extract actionable information from conversational input. Upon receiving the NL query 103 via the adapter 220, the generative model 240 may analyze the content of the NL query, identifying relevant keywords, entities, and/or contextual cues (e.g., references to resource objects, criteria for offset resources, or constraints on transferrable resources). The populatable prompt may be used as a structured template or instruction set that guides subsequent data retrieval via the adapter 220. The populatable prompt may specify the types of historical data to be retrieved from the historical data store 224, the attributes of resource objects 247 to be considered, and the value metrics for offset resources 249 to be appended. In some embodiments, the populatable prompt may include placeholders for fields that are to be filled with user-specific information, contextual parameters, or system-generated scores (e.g., similarity scores, usage frequency, or predicted utility). The prompt may be encoded in a machine-readable format, such as a JSON object or protocol buffer, facilitating integration with the application 209.

The adapter 220 may further determine resource objects 247 and their associated offset resources 249 by querying an offset resource data store 226. Resource objects 247 may represent digital resources associated with the transferrable resources that provide a benefit to the first entity 205 by way of an associated offset resource 249. Offset resources 249 may represent measurable benefits, enhancements, and/or digital (or tangible) rewards to the first entity 205 based on the respective resource object 247. Using a threshold condition, the IOS 202 may use historical data and contextual relevance to append offset resource information to the respective candidate resource objects.

Upon receiving the second output, the adapter 220 may send structured data files (e.g., JSON) to the IOS 202. The IOS 202, via API 252-1, instructs the GUI 208 of the edge device 201 to display a set of interactable objects, each corresponding to a resource object 247. In some examples, the GUI 208 may include visual cues or metadata highlighting the offset resource value. Interactable objects may be sorted or prioritized so that those with the greatest predicted and/or determined benefit, based on similarity scores and offset resource value, are presented most prominently or are highlighted. For example, the IOS 202 may evaluate one or more GUI parameters associated with the edge device 201, including resolution, orientation, available screen space (e.g., usable area), and accessibility features (e.g., high contrast mode, larger touch targets, or simplified display for accessibility compliance). Based at least in part on these GUI parameters and the threshold condition associated with the interactable objects, the IOS 202 selects a subset of interactable objects to display so that the first entity 205 is not overwhelmed and that the GUI 208 remains clear and usable. For example, on a smartwatch, only a single high-value control may be displayed while on a tablet, multiple objects may be shown in a scrollable layout.

The GUI parameters may be a set of edge device-specific and/or session-specific variables utilized by the application 209 and IOS 202 to optimize the presentation of interactable objects within the GUI 208 of the edge device 201. These GUI parameters may include, but are not limited to, screen orientation, screen resolution, physical display size, and accessibility settings. For example, screen orientation indicates whether the device display is set to portrait or landscape mode and directly affects the arrangement of interactable objects (e.g., a smartphone in portrait orientation may display a single column of interactable objects, while in landscape orientation the GUI 208 may enable a multi-column layout). Screen resolution (e.g., 1080×2340 pixels for a smartphone or 2560×1600 pixels for a tablet) determines the available pixel density for rendering interactable objects and influences both clarity and the number of interactable objects that can be comfortably displayed (e.g., a device with 820×1280 resolution may support two interactable objects per view, while a device with 1440×5200 resolution may support five or more objects). Physical display size (e.g., a diagonal measurement of 7.5 inches or 10.2 inches) may be used in conjunction with resolution and pixel density to ensure interactable objects are appropriately scaled for touch interaction and readability (e.g., a wearable device with a 1.2-inch screen may restrict the GUI 208 to displaying only a single interactable object to avoid accidental selections). Accessibility settings may include user-selected options such as large text mode, high contrast, or colorblind accommodations, which may further influence minimum recommended dimensions for each interactable object and reduce the number of interactable objects shown to maintain usability (e.g., enabling large text mode may reduce the maximum number of visible interactable objects from five to three).

The IOS 202 may retrieve the GUI parameters and determine a threshold condition to determine an optimal number of interactable objects that may be displayed at one time without compromising entity experience (e.g., if available vertical space is 800 pixels and each interactable object requires 200 pixels of height, the threshold condition may limit the GUI 208 to displaying four interactable objects). This threshold condition may be calculated by considering the usable viewport area after accounting for safe area insets, required padding, margins, and any persistent GUI elements such as headers or navigation bars (e.g., the presence of a persistent navigation bar may reduce available space and further restrict the number of interactable objects displayed). The IOS 202 may update the threshold condition in response to changes in edge device 201 orientation, resolution, screen space, application 209 changes, font size, or other contextual factors (e.g., rotating the device from portrait to landscape may increase the number of columns and allow for additional interactable objects to be shown). By applying these GUI parameters, the IOS 202 presents a relevant subset of interactable objects, selected according to historical user data and offset resource value to mitigate and/or prevent object crowding, information overload, and/or optimizing the user's decision-making process.

The threshold condition may be determined and used by the application 209 and/or IOS 202 to select the subset of interactable objects to display within the GUI 208 of the edge device 201. The threshold condition ensures that a quantity, arrangement, and/or prominence (e.g., position and/or how big the interactable object is on the GUI 208 from the perspective of the first entity 205) of interactable objects on the GUI 208 are optimized for device-specific and entity-specific constraints that are used to mitigate and/or prevent interactable object overcrowding and maintaining usability. In some embodiments, the threshold condition may be based on one or more GUI parameters, such as available screen space, orientation, pixel density, font size, and accessibility settings (e.g., large text mode, high contrast mode). For example, the threshold condition may be calculated by determining a number of interactable objects that can fit within the GUI 208, given a minimum dimension for touch targets and/or a presence of persistent application elements (e.g., if a smartphone in portrait orientation has a usable vertical space of 1000 pixels and each interactable object has a minimum height of 250 pixels, the threshold condition may restrict the GUI 208 to displaying no more than four interactable objects at once). The threshold condition may also factor in dynamic context, such as changes in screen orientation or accessibility settings (e.g., enabling large text mode may reduce the number of interactable objects displayed from five to three). In another example, if the first entity 205 enables colorblind mode, the threshold condition may adjust the visual contrast and arrangement of objects to ensure distinct differentiation.

The threshold condition may be further refined based on additional constraints, such as a maximum number of interactable objects that can be displayed without the first entity 205 having to scroll, a minimum padding between objects, and/or the presence of overlays or notifications (e.g., if an edge device displays a persistent notification banner, the available space for interactable objects is reduced). In some embodiments, the threshold condition may be recalculated in real-time as the entity interacts with the GUI 208 (e.g., rotating the device from portrait to landscape may trigger an update to the threshold condition, allowing more objects to be displayed in a wider layout). By applying the threshold condition, the IOS 202 and application 209 work together so that a relevant subset of interactable objects, as determined by historical data and offset resource value for example, are presented to the first entity 205 on the GUI 208.

In some embodiments, a determination of a target GUI layout for the GUI 208 of the edge device 201 may be determined using at least one of GUI parameters and hardware limitations of the edge device 201. For example, the application 209 and IOS 202 may jointly retrieve GUI parameters including screen orientation, screen resolution, physical display size, and accessibility settings, as well as edge device-specific hardware metrics such as available processing power, onboard memory, display capabilities, and/or network connectivity status. For example, GUI parameters such as portrait versus landscape orientation and pixel dimensions may be used to calculate an optimal arrangement and scaling of interactable objects (e.g., a smartphone in portrait orientation with 1080×2340 resolution may display a single column of interactable objects, whereas the same device in landscape orientation may display two columns). Physical display size and pixel density are factored in to ensure touch targets and text are appropriately sized for readability and usability (e.g., a wearable device with a 1.2-inch screen may restrict the GUI 208 to a single interactable object per view to avoid inadvertent selections).

Hardware limitations may be considered in tandem with GUI parameters to refine a target GUI layout. If the edge device 201 is determined to have limited processing power (e.g., a low-power processor or active battery-saving mode), the IOS 202 may select a simplified GUI layout, minimizing resource-intensive graphical effects and animations (e.g., static icons, reduced color gradients). Memory constraints, such as limited available RAM, may prompt the IOS 202 to restrict a number of interactable objects loaded into the GUI 208, implement lazy loading for detailed object previews, and/or prioritize essential metadata (e.g., only displaying basic object information until further user interaction is detected). Display capabilities such as color depth and brightness range are also referenced, with the GUI parameters guiding the selection of themes and font sizes for optimal visibility (e.g., high-contrast modes, monochromatic icons on displays with limited color fidelity). Network connectivity status, queried via the API 252, may be used in determining both a quality and volume of content presented on the GUI 208. For example, when the edge device 201 is connected to a high-bandwidth Wi-Fi network, the IOS 202 may use GUI parameters to enable a more detailed and interactive GUI layout, permitting higher-resolution images, prefetching of additional interactable object details, and/or loading of supplementary offset resource data (e.g., the GUI 208 may display interactive tooltips and video previews for each interactable object). In contrast, when the device is operating on a metered cellular connection such as LTE or 5G, the IOS 202 may adjust both GUI parameters and hardware constraints to minimize data usage by reducing the resolution of graphical assets, compressing images, and limiting the number of interactable objects displayed (e.g., the GUI 208 may only show essential icons and metadata to conserve bandwidth).

The IOS 202 may determine the threshold condition by using GUI parameters (e.g., usable viewport area, font size, orientation) and hardware metrics (e.g., memory availability and network type) to determine the maximum number and arrangement of interactable objects that can be efficiently displayed at any given time (e.g., if available vertical space is 800 pixels and each interactable object has a minimum height of 200 pixels, the threshold condition restricts the GUI 208 to four objects; if the edge device switches from Wi-Fi to LTE, the number may be further reduced to two objects to conserve data usage and limit network traffic). In addition, accessibility settings retrieved as part of the GUI parameters, such as large text mode or high-contrast preference, may override default layout calculations to prioritize usability for the first entity 205 (e.g., enabling large text mode reduces the number of interactable objects from five to three for improved readability for the first entity 205). Throughout the session, the IOS 202 may periodically reassess both GUI parameters and hardware limitations in real-time, updating the target GUI layout as edge device 201 conditions change (e.g., rotating the device, switching network connections, entering low-power mode, or modifying accessibility settings). Doing so ensures that a presentation and functionality of interactable objects within the GUI 208 are optimized for the combined constraints and capabilities of the edge device 201, providing a unique GUI 208 regardless of device environment or operational context (e.g., a tablet on Wi-Fi in landscape orientation may show six interactable objects with rich previews, while a phone on LTE in portrait orientation and large text mode may display only two simplified objects).

The historical data store 224 may be a persistent, queryable repository that maintains records of prior entity interactions, behaviors, selections, transferrable resource transfers, and/or contextual engagement metrics associated with the first entity 205 and other system participants. The historical data store 224 may be implemented using relational databases, time-series data stores, document-oriented archives, or cloud-based object storage, and is designed to enable retrieval and analysis of historical data for use in similarity scoring, preference inference, and threshold condition determinations. By way of a non-limiting example, records within the historical data store 224 may include detailed logs of NL queries submitted by the first entity 205, interactable object selections (e.g., which resource objects were chosen, time of selection, device context), resource object activation events, offset resource applications, and transferrable resource transactions (e.g., transfer history between accounts or entities). Each entry may be modified with contextual metadata, such as edge device type, location, session duration, or environmental factors (e.g., if the edge device 201 is used in a low-light setting, the historical data may record the preference for high-contrast GUI layouts). For example, the historical data store 224 may track how often a particular resource object is selected by the first entity 205 (e.g., once per quarter), the outcome of offset resource application, and the frequency or success rate of transferrable resource transfers to second entities 257. This data enables the adapter 220 and generative model 240, in conjunction, to determine similarity scores between current NL queries and past interactions (e.g., if a query closely matches a previously submitted request that led to a high-value offset resource, the IOS 202 can prioritize similar resource objects).

In some embodiments, the historical data store 224 may support clustering entity preferences of resource objects, predicting future selections, and/or detecting behavioral trends (e.g., identifying that the first entity 205 tends to select modules with higher offset resource values). The data store 224 may also implement data retention policies, privacy controls, and access auditing to ensure compliance with regulatory or organizational policies (e.g., anonymizing sensitive fields, restricting access to certain data types, or maintaining audit logs of data queries).

In some embodiments, the generative model data store 222 may include a structured and indexed repository of one or more generative models, generative model configurations, and/or related metadata, maintained to support processing of NL queries. The generative model data store 222 may be implemented as a relational database, a NoSQL data store, a file-based archive, or a distributed cloud storage system, for example, depending on IOS 202 configurations for scalability, access speed, and/or redundancy. Each entry within the generative model data store 222 may include a trained generative model (e.g., a LLM, transformer-based neural network, and/or context-aware recurrent neural network), versioning information, supported languages, domain specializations, and performance metrics. For example, the generative model data store 222 may contain separate models optimized for specific types of resource selection scenarios (e.g., one model trained for resource object recommendations, another for historical data analysis, and a third for entity behavior identification). Each generative model entry may further specify expected input formats, supported query types, and/or contextual fields so the adapter 220 may select an appropriate generative model for a given NL query 103 (e.g., if the NL query references "study modules," the adapter 220 retrieves a model tuned for educational contexts). The data store 222 may also maintain usage statistics, model update logs, and/or compatibility flags for integration with various edge devices.

In some embodiments, the generative model data store 222 may support generative model deployment and updating, allowing the IOS 202 (or other suitable component) to train, update, generate, and/or upload new generative model versions, apply fine-tuning based on entity interaction data (e.g., stored in historical data store 224), or retire obsolete generative models where suitable. The data store 222 may further integrate with monitoring tools to track generative model performance and ensure compliance with the IOS 202 (e.g., logging generative model response times, error rates, or contextual matching scores).

The first entity 205 may interact with the GUI 208 to select, by interacting with an interactable object, a desired resource object 259, which is associated with an offset resource 258 to be applied to the first account 204 when at least one transferrable resource is transferred to a second account 256 of a second entity 257. The second entity 257 may represent another device, a group member, or a system endpoint. Upon selection, the IOS 202 activates the chosen resource object, applies the offset resource to the first account 204, and securely transfers the transferrable resource to the second account 256.

In some embodiments, the IOS 202 may receive feedback from the first entity 205 concerning the subset of interactable objects presented within the GUI 208 of the application 209 on the edge device 201. After displaying the subset of interactable objects, the application 209 may prompt the first entity 205 to provide explicit feedback regarding the relevance, usefulness, and/or desirability of the presented options (e.g., a thumbs-up/thumbs-down selection, a star rating system, or an option to mark objects as "favorite" or "not relevant"). Feedback may also be received through indirect mechanisms, such as monitoring which interactable objects are selected most frequently, which resource objects 247 are ignored or dismissed, or which resource objects 247 are interacted with for longer durations (e.g., tracking tap counts, dwell time, or swipe actions on each interactable object). The received feedback may be processed by the IOS 202 and stored in a feedback data structure in the historical data store 224, which can be referenced during subsequent resource object selection and ranking operations. For example, if the first entity 205 periodically rates certain interactable objects as undesired or irrelevant (e.g., marking resource objects as "not applicable"), the IOS 202 may adjust similarity score calculations and threshold conditions to deprioritize or exclude those resource objects 247 from later presentations. In addition, or alternatively, positive feedback (e.g., marking a resource object 247 "very effective" or indicating a preference for a specific offset resource) may increase a likelihood that similar resource objects 247 are prioritized in future GUI 208 presentations.

In some configurations, the IOS 202 may aggregate feedback from multiple sessions or across different contexts to build a profile of the first entity 205 preferences and refine interactable object selection (e.g., the IOS 202 may learn over time that the first entity 205 prefers certain resource objects with certain offset resources in specific geofenced locations). Feedback mechanisms may also support real-time adaptation, allowing the application 209 and IOS 202 to update the presented subset of interactable objects based on feedback (e.g., if the first entity 205 indicates that none of the current resource objects 247 are desired, the IOS 202 may fetch and display a new set of resource objects 247).

Figure 3:
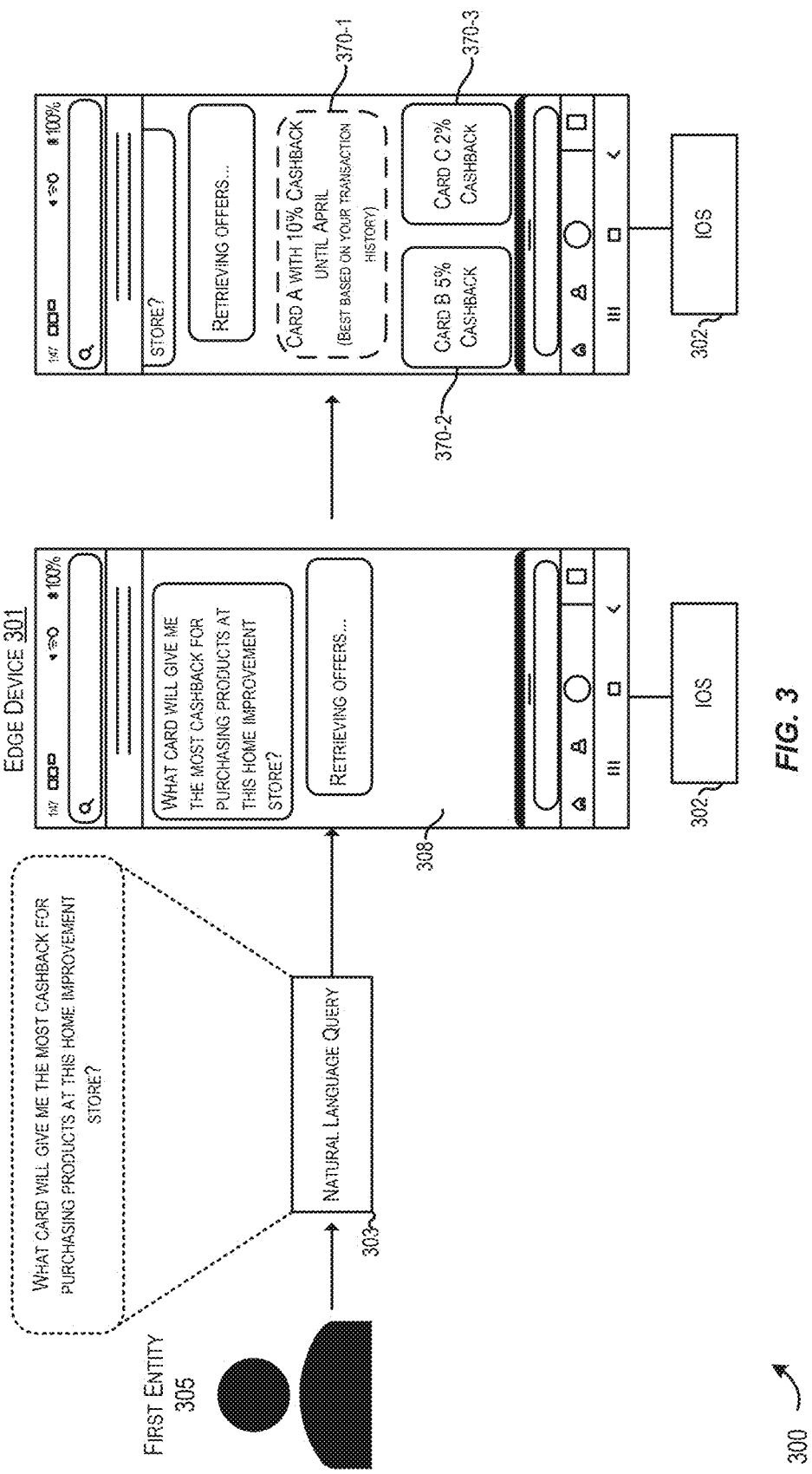
FIG. 3 is a simplified block diagram of example IOS portal that receives a natural language query, according to certain embodiments.

FIG. 3 is a simplified block diagram of example IOS portal 300 that receives a natural language query, according to certain embodiments. By way of a non-limiting example, a first entity 305 (which is an example of the first entity 205 with respect to FIG. 2), which may include a user, device owner, or authorized agent, providing a NL query 303 to an edge device 301. The edge device 301 may be realized as a smartphone, tablet, wearable device, or dedicated IoT control panel, and is operable to execute a GUI 308 that serves as a portal for interfacing with an IOS 302 (e.g., IOS 102 with respect to FIG. 1). The NL query 303 may be submitted by the first entity 305 in various forms, including but not limited to a spoken request, a typed query, or a gesture-based input. For purposes of illustration, the NL query 303 may comprise, "What card will give me the most cashback for purchasing products at this home improvement store?" or a suitable equivalent. The GUI 308 of the edge device 301 may capture the NL query 303 and transmit the query to the IOS 302 for processing.

Upon receiving the NL query 303, the edge device 301, by way of the GUI 308, forwards the NL query to the IOS 302, which may be implemented locally or remotely (e.g., as a cloud-based service). The IOS 302 operates to parse the NL query 303, extract relevant intent and contextual information (e.g., references to "cashback," "home improvement store," or a merchant identifier), and initiate a process for generating request context metadata as described in more detail with respect to FIG. 2. In some embodiments, the IOS 302 references historical data associated with the first entity 305, including records of prior credit card usage, previous offset resource applications, and merchant-specific transaction patterns, to enrich the contextual understanding of the NL query 303. The IOS 302 may invoke a generative model, as described with respect to FIG. 2, to process the NL query 303 and generate request context metadata that includes one or more similarity scores. The similarity scores may be determined by comparing the NL query 303 to historical queries, transaction records, and previous selection data associated with the first entity 305. For example, if the first entity 305 has historically selected a particular credit card resource object at similar merchants and received substantial cashback rewards, the similarity score for that resource object may be elevated in the present context. The request context metadata may further include inferred preferences, behavioral patterns, and device-specific context, such as geolocation data or current session state.

Based at least in part on the request context metadata and the relevant portion of the NL query 303, the IOS 302 may identify a set of resource objects that represent available options to the first entity 305. Each resource object may correspond to a digital representation of a credit card, account, or suitable equivalent, and is associated with one or more offset resources, such as cashback offers, promotional bonuses, and/or time-limited rewards. The IOS 302 may further determine which resource objects satisfy a threshold condition based on device-specific GUI parameters (e.g., screen size, orientation, accessibility settings, or available viewport area), ensuring that only a manageable subset of interactable objects is presented to the first entity 305.

The IOS 302 generates instructions for the GUI 308 of the edge device 301 to render a set of interactable objects 370, each corresponding to a resource object and its associated offset resource. The interactable objects 370 may be visually differentiated by labels, icons, ranking information, or graphical cues indicating the projected benefit to the first entity 305 (e.g., "10% cashback at home improvement stores with Card A," "$20 bonus on purchases over $100," "2% cashback everywhere"). The arrangement, scaling, and positioning of the interactable objects 370 within the GUI 308 are determined according to the GUI parameters and the threshold condition, which may take into account available screen space, font size, orientation, and accessibility preferences. For example, on a smartphone in portrait orientation, the GUI 308 may display only the top three interactable objects 370, with the highest-ranked object visually emphasized, while on a tablet in landscape orientation, up to five interactable objects 370 may be displayed in a horizontal arrangement.

Upon reviewing the interactable objects 370 presented within the GUI 308, the first entity 305 may select a desired interactable object, such as the credit card offering the highest cashback reward. The GUI 308 captures the selection and transmits it to the IOS 302, which activates the corresponding resource object and applies the associated offset resource to the first account of the first entity 305. The IOS 302 may further cause transfer of a transferrable resource (e.g., payment using the selected credit card) from the first account to a second account associated with a second entity, such as a merchant or payment processor. The entire interaction, including the NL query 303, similarity score computation, resource object selection, offset resource application, and GUI adaptation, may be recorded in a historical data store for future analysis, feedback incorporation, and ongoing refinement of recommendation logic. By way of a non-limiting example, a first entity 305 standing at a home improvement store may use their smartphone (edge device 301) to speak the query "What card will give me the most cashback for purchasing products at this home improvement store?" The GUI 308 transcribes the input and relays it to the IOS 302, which references prior credit card usage, discovers a current 10% cashback promotion on "CardA," (e.g., interactable object 370-1) and generates three interactable objects 370-1 to 370-3 for display. The optimal choice, "CardA," is visually highlighted in the GUI 308 (optionally animated to draw attention), and the first entity 305 selects it. The IOS 302 activates the resource object and offset resource, processes the transaction, applies the reward, and logs the event for future personalization and adaptation.

Figure 4:
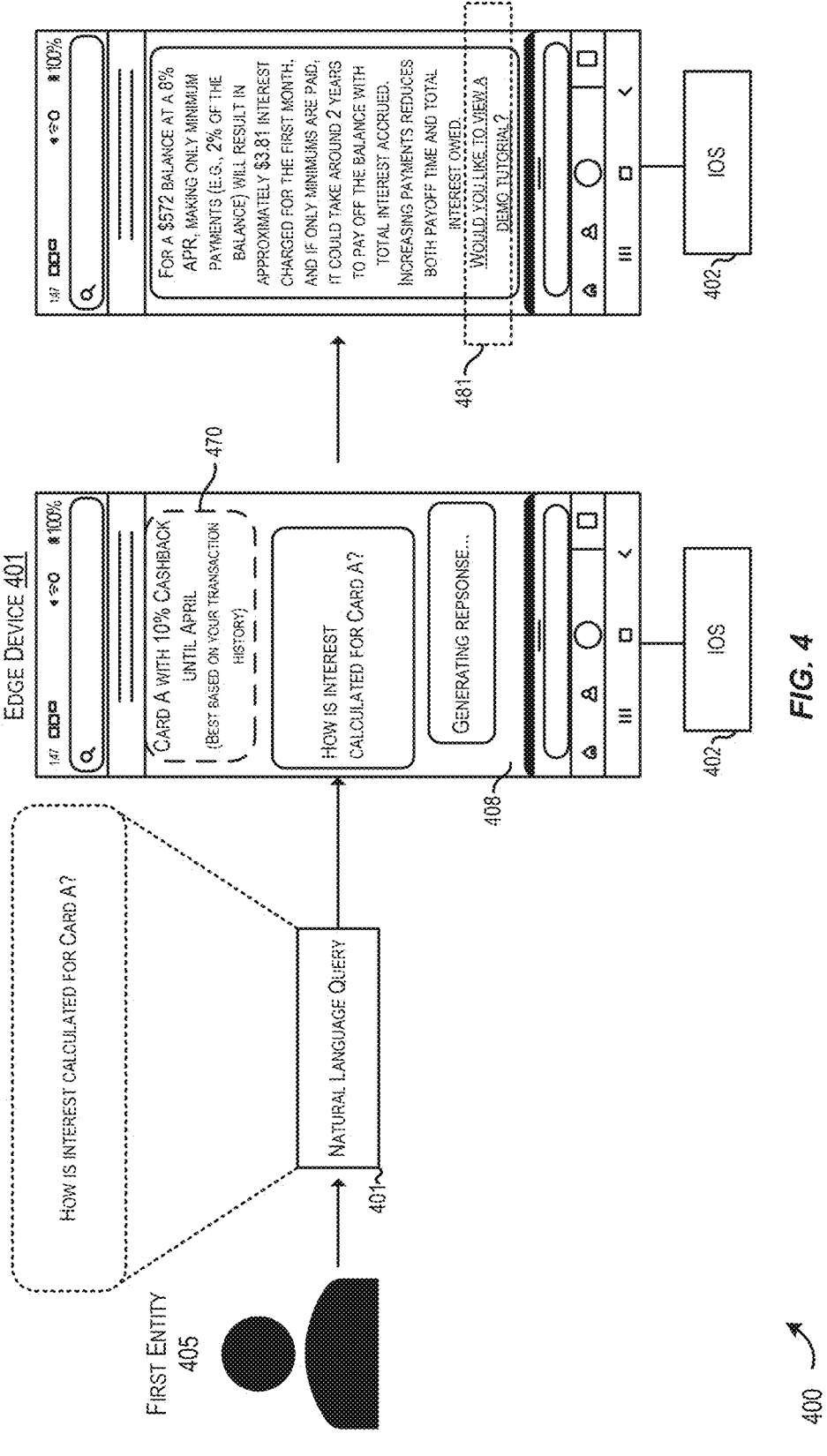
FIG. 4 is a simplified block diagram of example IOS portal that receives a natural language query, according to certain embodiments.

FIG. 4 is a simplified block diagram of example IOS portal 400 that receives a natural language query, according to certain embodiments. By way of a non-limiting example, FIG. 4 illustrates a possible continuation of the interactive process described with respect to FIG. 3, with a first entity 405, which may be the same user, device owner, or authorized agent, interacts with an edge device 401 to request additional information pertaining to one of the interactable objects previously presented. The edge device 401 serves as a portal for interfacing with an IOS 402 (which is an example of IOS 302 with respect to FIG. 3). Following a prior presentation of interactable objects 470, such as those representing various credit cards and their associated offset resources as described with respect to FIG. 3, the first entity 405 submits a follow-up NL query 403 through the GUI 408 of the edge device 401. For purposes of illustration, the NL query 403 may include a request for further information about a specific interactable object or its underlying resource object, such as, "How is interest calculated for Card A?" or a suitable equivalent. The GUI 408 captures the NL query 403, which may be provided as a spoken, typed, or gesture-based input referencing one of the interactable objects 470 currently displayed or previously selected by the first entity 405. In certain embodiments, the GUI 408 may enable the first entity 405 to select or highlight the relevant interactable object 470, for example by tapping on "Card A," before or during the submission of the follow-up query to providing explicit contextual linkage between the NL query 403 and the resource object of interest.

Upon receipt of the NL query 403, the edge device 401 may transmit the NL query, along with any relevant selection context, to the IOS 402 for processing. The IOS 402 may be implemented locally or remotely and operates to parse the NL query 403 to determine the user's intent, such as a request for detailed information on how interest is accrued for a specific credit card or resource object. The IOS 402 references historical data and system records associated with the first entity 405, including prior queries, interactable object selections, and user profile information, to provide a personalized and contextually relevant response. In various embodiments, the IOS 402 invokes a generative model, as described with respect to FIG. 2, to process the NL query 403 and generate a detailed explanation or tutorial tailored to the selected resource object 470-1, for example "Card A." The generative model may determine and assemble dynamic data, such as the current balance, applicable annual percentage rate (APR), minimum payment terms, and payoff scenarios based on user-specific or typical values. By way of a non-limiting example, the generated response may state: "For a $572 balance at an 8% APR, making only minimum payments, such as 2% of the balance, will result in approximately $3.81 interest charged for the first month, and if only minimums are paid, it could take around 2 years to pay off the balance with total interest accrued. Increasing payments reduces both payoff time and total interest owed." This response may be presented as a detailed textual explanation within the GUI 408, optionally accompanied by dynamically calculated figures based on the first entity's actual account data or representative example values.

In addition to the textual explanation, the IOS 402 may cause the GUI 408 to present an interactable link 481 (e.g., hyperlink, pointer, etc.) for an interactive tutorial corresponding to the response. The tutorial may be a video tutorial, a live agent session, or a suitable equivalent, and is provided as a selectable option within the GUI 408, such as a "Would you like to view a demo tutorial?" prompt with an associated clickable link or button. The tutorial link 481 may be contextually generated and tailored to the specific resource object and NL query, offering the first entity 405 the opportunity to engage with more immersive or personalized educational resources. For example, selecting the tutorial link 481 may launch a video demonstration illustrating how interest accumulates over time, initiate a live chat or video call with a financial advisor, or provide an interactive calculator allowing the first entity 405 to input different payment amounts and observe projected payoff timelines and total interest costs.

The interactable objects 470 remain accessible within the GUI 408, and the interface may be updated to visually indicate which resource object or offset resource is currently the focus of the additional information or tutorial. The arrangement, scaling, and positioning of the interactable objects 470 and tutorial link 481 within the GUI 408 are determined by the same GUI parameters and threshold conditions as described in previous embodiments, such as screen size, orientation, or accessibility settings, ensuring that the interface remains clear and actionable regardless of device constraints. For example, if the first entity 405 has enabled large text or high-contrast mode, the tutorial link 481 may be rendered as a prominent button or banner to facilitate discoverability and accessibility. Upon engagement with the tutorial link 481, the IOS 402 may further record the first entity's 405 interaction, updating the historical data store with feedback and usage metrics to inform subsequent recommendations, personalize future tutorials, or prioritize types of educational content most frequently accessed by the first entity 405. In this manner, the IOS 402 may support an iterative and user-driven feedback loop that continuously improves the relevance and utility of follow-up information and educational resources.

By way of a non-limiting example, the first entity 405, after viewing interactable objects 470 corresponding to available credit card options, selects "Card A" and submits the NL query, "How is interest calculated for Card A?" The GUI 408 relays the query to the IOS 402, which generates a detailed explanation based on the first entity's recent balance and interest rate, and presents a link 481 labeled "View Demo Tutorial." The first entity 405 selects the tutorial link 481 and is presented with an interactive video explaining interest accrual, projected payoff time, and strategies for minimizing total interest. All actions are logged for future personalization and system refinement. The IOS 402 accommodates follow-up NL queries requesting additional information about a specific interactable object or resource object, provides detailed and contextually relevant explanations, and offers interactive tutorials or live assistance as selectable options within the GUI.

Figure 5:
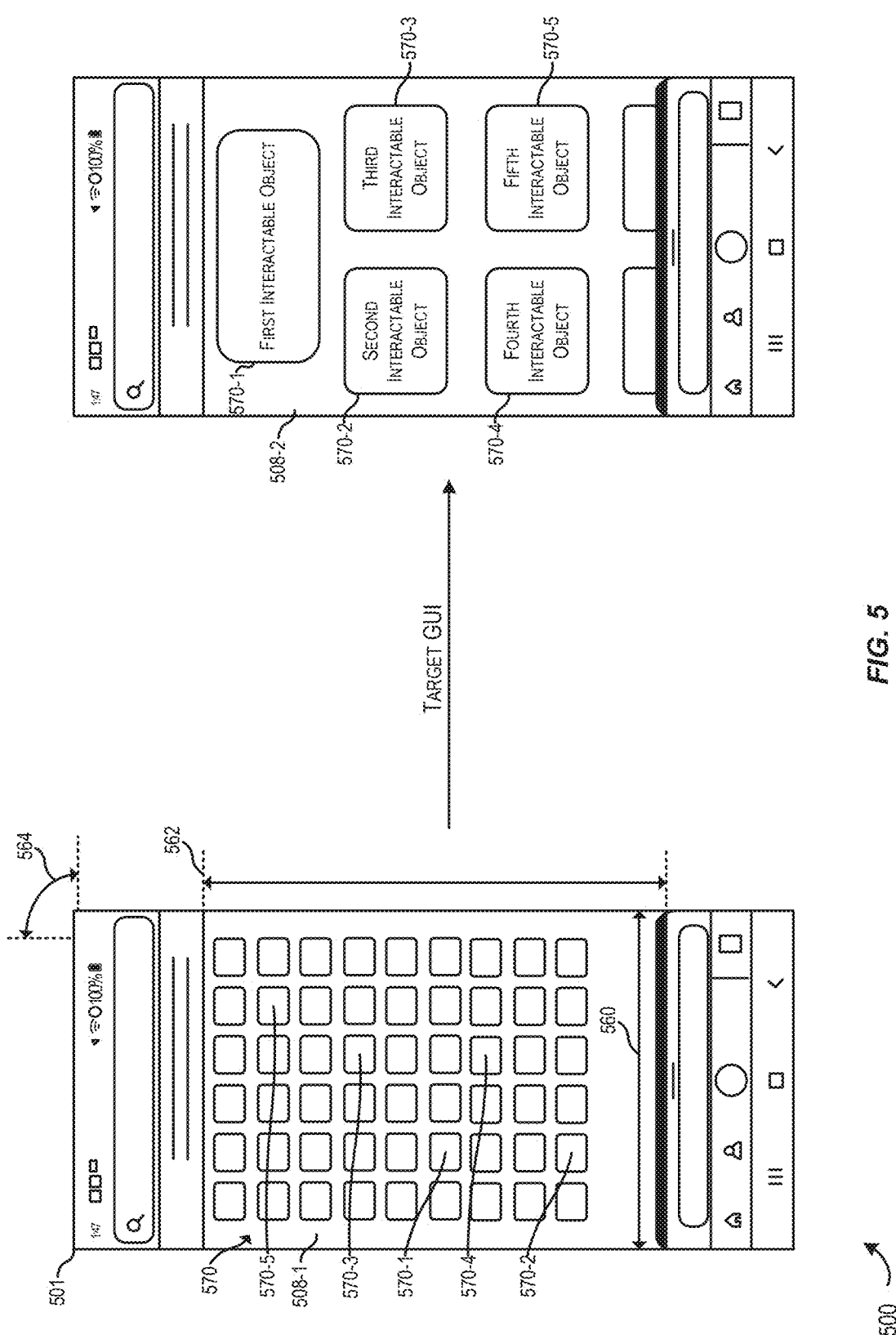
FIG. 5 is a simplified diagram of an example target graphical user interface with interactable object optimization, according to certain embodiments.

FIG. 5 is a simplified diagram of an example target graphical user interface with interactable object optimization, according to certain embodiments. By way of a non-limiting example, a GUI 508-1 may be rendered on an edge device 501 with an initial crowded display of interactable objects 570 depicted on the left) that may be transformed into a target GUI 508-2 layout (depicted on the right). The GUI 508-1 initially presents a set of interactable objects, including first through fifth interactable objects 570-1, 570-2, 570-3, 570-4, and 570-5, positioned in a crowded arrangement on the left side that would be difficult to quickly identify. The crowded view may result from a combination of limited available screen space, suboptimal orientation, and/or excessive interactable objects (associated with resource objects) being rendered simultaneously. A footprint of the GUI 508 may be defined by a height 562 and a width 560, which together determine the usable display area for interactable objects on the edge device 501. The edge device 501 may be oriented along various angles 564, such as rotating from portrait mode to landscape mode or vice versa as an entity utilizes the edge device 501. Changes in orientation may be detected in real time and be relayed to an IOS (e.g., as in IOS 202 with respect to FIG. 2) in order to generate the target GUI 508-2. Upon detecting a shift in orientation (e.g., the entity rotates a smartphone from vertical to horizontal), the IOS may recalculate GUI parameters, including updated width 560 and height 562, and reevaluates the threshold condition for the number and arrangement of interactable objects 570 that can be effectively displayed. For example, switching from portrait mode (narrow width, tall height) to landscape mode (wide width, shorter height) may allow for more interactable objects to be presented side by side, while maintaining or reducing vertical stacking to prevent overlap or crowding (e.g., in portrait, only two objects may be stacked vertically, whereas in landscape, three objects may be arranged horizontally).

The IOS may use these recalculated GUI parameters and/or the edge device 501 hardware limitations (e.g., processing power, memory, and network connectivity) to select a subset of interactable objects 570 (e.g., interactable objects 570-1 to 570-5) for display in the target GUI layout. The IOS may apply sorting logic based on historical data and offset resource values associated with resource objects (as described in FIG. 2) to prioritize which interactable objects should be rendered most prominently. For example, interactable objects 570-1 through 570-5 are chosen based on their relevance, predicted utility, and compliance with the current threshold condition (e.g., if the threshold condition limits the display to five interactable objects in landscape orientation, only 570-1 to 570-5 are selected). The target GUI 508-2 layout depicted on the right side of FIG. 5 depicts how the interactable objects 570-1 through 570-5 are repositioned and spaced within the GUI 508 to maximize visibility, accessibility, and/or usability.

The IOS may adjust the size, padding, and/or arrangement of each interactable object 570 in accordance with the GUI parameters and/or hardware limitations so that all interactable objects are clearly distinguishable and easily selectable by the first entity 505. For example, in landscape mode, interactable objects 570 may be distributed in a horizontal row with increased spacing, larger touch targets, and/or visual cues (e.g., color highlights, badges, text, or icons indicating offset resource value). Throughout this process, the system dynamically adapts the GUI layout in response to real-time changes in device orientation, screen size, and user preferences. By continuously monitoring and updating the footprint of the GUI 508 and the positions of interactable objects 570, the application 209 and IOS 202 ensure that the user experience remains optimized and efficient, regardless of device configuration or operational context (e.g., when the user rotates the device, the system seamlessly transitions from a crowded vertical stack to an organized horizontal layout, displaying only the most relevant subset of interactable objects).

Figure 6:
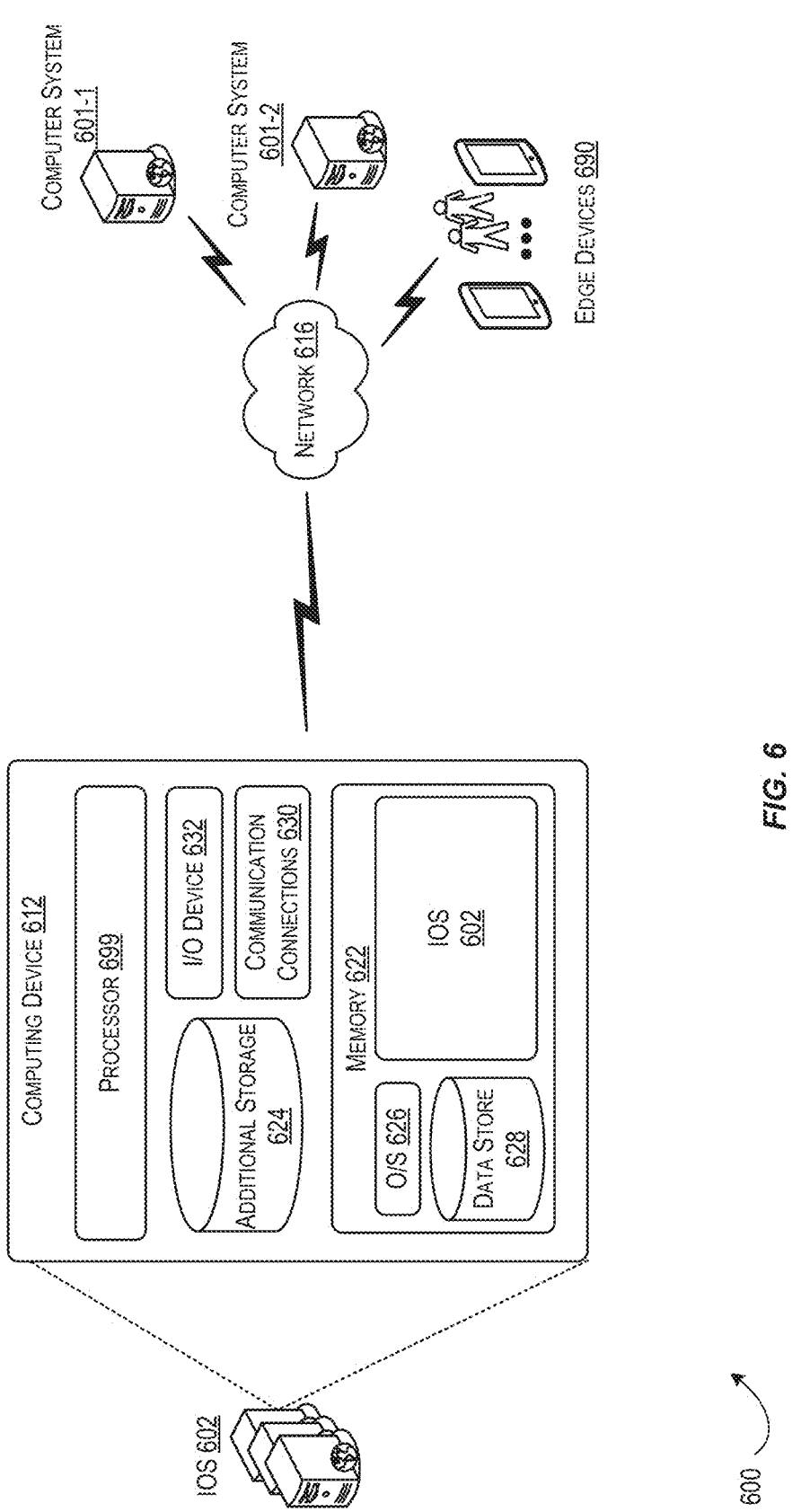
FIG. 6 is a simplified diagram of example cloud network used to optimize graphical user interfaces using resource object prioritization, according to certain embodiments.

FIG. 6 is a simplified diagram 600 of example cloud network used to optimize graphical user interfaces using resource object prioritization, according to certain embodiments. An IOS 602 (which is an example of IOS 202 with respect to FIG. 2) is depicted as being hosted on a computing device 612, which may include one or more processors 699. The processors 699 may be realized through hardware, computer-executable instructions, firmware, or any combination thereof. Computer-executable and firmware implementations of processors 699 may include instructions written in any suitable programming language for executing tasks associated with the IOS 602, such as natural language query processing, similarity score computation, resource object ranking, and dynamic GUI layout adaptation.

The computing device 612 may comprise memory 622, which may store computer-executable instructions loadable and executable by the processors 699, as well as data generated or received during execution of the IOS 602. The memory 622 may be volatile (e.g., RAM) and/or non-volatile (e.g., ROM, flash memory), and may be supplemented by additional storage 624, which may be removable or non-removable and may consist of magnetic storage, optical disks, tape storage, or other suitable media for persistent data retention. The combination of memory 622 and additional storage 624 may provide non-transitory computer-readable storage media for storing instructions, data structures, program components, and other information necessary for operation of the IOS 602 (e.g., generative model data store 228, historical data store 229, resource object catalogs, and offset resource mapping tables).

The memory 622 may store an operating system (O/S) 626, instructions for executing functionalities of the IOS 602, one or more data stores 628, and application programs, components, or services relevant to the disclosed processes. For instance, the IOS 602 may implement services to receive and analyze NL queries from edge devices 690, determine similarity scores using historical data, determine threshold conditions for interactable object display, and transmit optimized GUI instructions to client applications. The computing device 612 may include communication connections 630, which may allow the device to interface with databases, other computing devices, servers, user terminals, and/or additional systems over one or more networks 616. Networks 616 may include any suitable combination of wired or wireless networks, such as the Internet, cellular networks, private enterprise networks, and other public or private communication infrastructures.

Input and output devices (I/O devices) 632 may be provided as part of the computing device 612, including but not limited to keyboards, mice, touchscreens, displays, speakers, printers, and other user or system interfaces. Edge devices 690 may communicate with the IOS 602 over network 616, transmitting natural language queries, device context information, and feedback data for processing and analysis. The IOS 602 may aggregate, store, and process these inputs, performing normalization, similarity analysis, and transformation into standardized representations (e.g., generating populatable prompts, resource object rankings, and context-aware GUI layouts) for further technical operations and downstream applications.

The various embodiments can be further implemented in a variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also typically include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Figure 7:
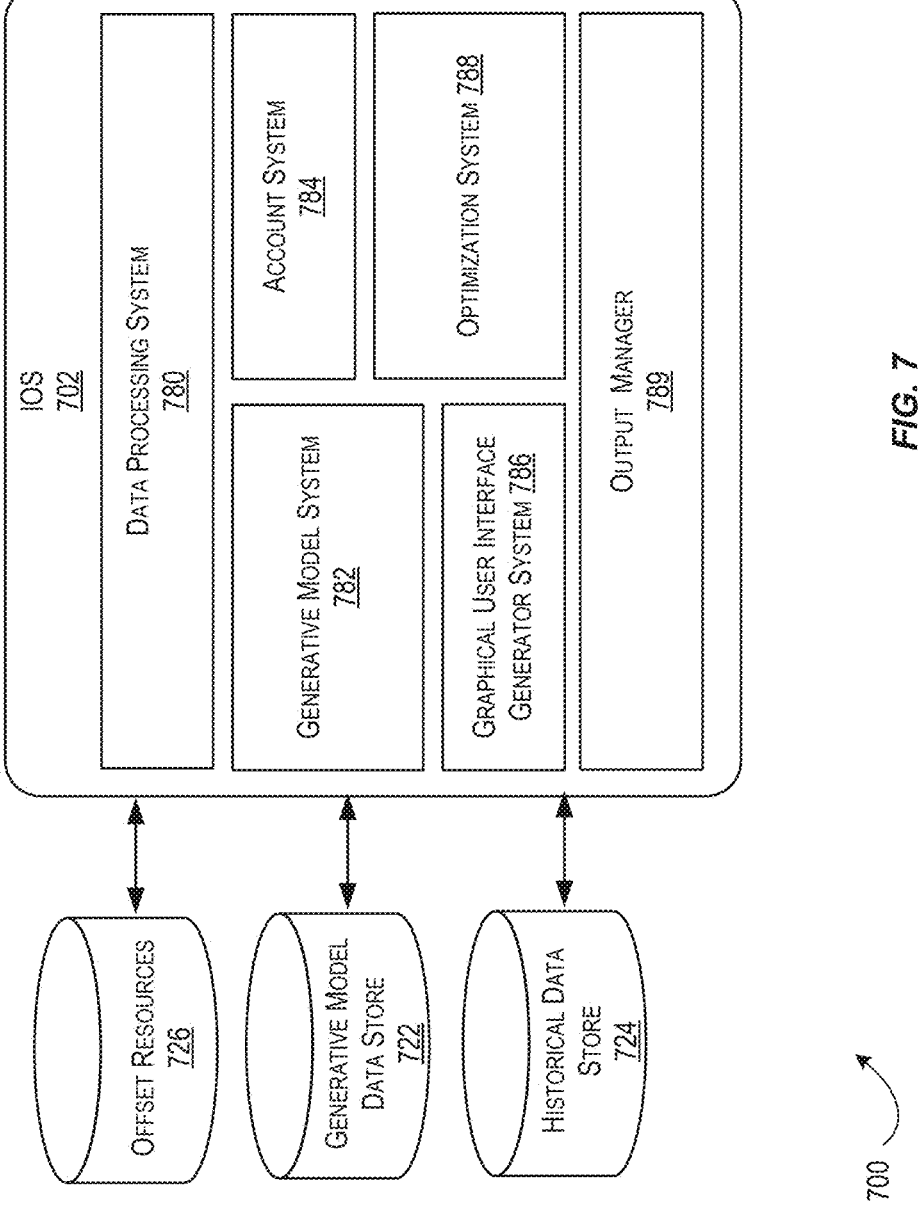
FIG. 7 is a simplified diagram of example computer architecture, according to certain embodiments.

FIG. 7 is a simplified diagram of example computer architecture 700, according to certain embodiments. An IOS 702 (which is an example of IOS 202 with respect to FIG. 2) is depicted as a hub for coordinating, prioritizing, and deploying resource object selection and adaptive GUI layouts across a plurality of technical environments. The IOS 702 interfaces with several components, including an offset resource data store 726, a generative model data store 722, a historical data store 724, a data processing system 780, an account system 784, a generative model system 782, a GUI generator system 786, an optimization system 788, and an output manager 789.

A generative model data store 722 provides a structured repository of one or more generative models (e.g., generative model 240 with respect to FIG. 2), model configurations, and relevant metadata, supporting dynamic selection and deployment of models for natural language query processing and resource object prioritization.

The historical data store 724 comprises a persistent, queryable record of prior user interactions, selections, resource transfers, feedback, and contextual engagement data, which enables similarity scoring, preference inference, and adaptive ranking of resource objects and offset resources.

The IOS 702 is operably connected to a data processing system 780, which acts as an input interface for receiving, normalizing, and preparing data from external repositories, edge devices, sensors, or other computer systems. The data processing system 780 may ingest natural language queries, device context information, feedback data, and other relevant signals, performing compatibility checks, data cleaning, and format conversion as necessary to ensure seamless integration with downstream systems.

An account system 784 may manage digital representations of entities, including functions for account creation, updating, and storage of account data (e.g., associating transferrable resources and offset resources with user profiles, storing account preferences, and managing access rights). The account system 784 enables secure, auditable management of entity identity, resource allocation, and offset resource application.

A generative model system 782 may be responsible for determining which generative models to use, sending prompts to the selected generative models, and managing model execution and integration. The generative model system 782 may maintain a repository of trained generative models for different technical domains or resource selection contexts, as well as implement versioning, performance monitoring, and model update processes. The generative model system 782 may reference the generative model data store 722 for retrieval of specific models and configurations, and coordinate input/output with the IOS 702 and data processing system 780.

A GUI generator system 786 may generate target GUI layouts. The GUI generator system 786 utilizes GUI parameters (e.g., screen orientation, resolution, size, accessibility settings, etc.), similarity scores determined from historical data, and threshold conditions derived from device and hardware limitations to determine the optimal subset and arrangement of interactable objects that are associated with resource objects and offset resources. The GUI generator system 786 may produce GUI layout instructions, rendering templates, and/or metadata for transmission to edge devices and user-facing applications.

An optimization system 788 may model and execute algorithms that enhance the efficiency of the overall architecture. The optimization system 788 may optimize GUI layouts for usability, minimize network traffic, reduce memory and processing needs on edge devices, and balance system performance with resource constraints (e.g., dynamically scaling down graphical assets on low-power devices, batching network requests, or compressing data streams). The optimization system 788 may also perform simulation and analytics to inform generative model tuning and account for entity behavior.

An output manager 789 facilitates deployment of target GUI layouts, activation of resource objects, application of offset resources, and/or updating of account data. The output manager 789 may coordinate output operations across cloud platforms, edge devices, and external systems so that optimized GUIs, account changes, and resource object activations are executed. The output manager 789 may also provide APIs, data export utilities, and integration points for other applications or services.

All components of IOS 702 may communicate via internal data buses, network interfaces, or inter-process communication mechanisms, supporting both centralized and distributed deployment models. The computer architecture 700 may operate across a range of environments, including cloud servers, on-premises data centers, and edge devices, and is compatible with a variety of user applications, edge device types, and suitable technical domains.

FIG. 8 is a simplified diagram of an example method 800 for resource object identification and activation, according to certain embodiments. A non-transitory computer-readable storage medium may store computer-executable instructions that, when executed by at least one processor, cause at least one computer to perform instructions comprising the operations of the method 800. It should be appreciated that the operations of the method 800 may be performed in any suitable order, not necessarily the order depicted in FIG. 8. Further, the method 800 may include additional, or fewer operations than those depicted in FIG. 8. The operations of method 800 may be performed by any suitable portion of the IOS of FIG. 2 (an example of the IOS 102 with respect to FIG. 1) which may include one or more computing devices such as computing device 612 of FIG. 6.

At block 802, the method 800 may include receiving, from an edge device including graphical user interface (GUI), a natural language (NL) query associated with a first entity. By way of a non-limiting example, the edge device may be associated with a first account of the first entity that contains at least one transferrable resource. The edge device (e.g., edge device 301 with respect to FIG. 3 or edge device 401 with respect to FIG. 4) may be realized as a smartphone, tablet, wearable device, or IoT control panel. The GUI (e.g., GUI 308 with respect to FIG. 3 or GUI 408 with respect to FIG. 4) is configured to capture user input. For instance, a first entity 305 may speak or type a query such as, "What card will give me the most cashback for purchasing products at this home improvement store?" The NL query 303 is received and transmitted to an interaction optimization system (IOS) (e.g., IOS 302 with respect to FIG. 3 or IOS 402 with respect to FIG. 4) for further processing. The first account (e.g., first account 204 with respect to FIG. 2) stores transferrable resources, such as digital representations of credit cards, loyalty credentials, or device access tokens.

At block 804, the method 800 may include providing the NL query as a first input to a generative model. By way of a non-limiting example, wherein the first input includes instructions requesting a prompt template based at least in part on the first account. By way of a non-limiting example, the first input may include instructions requesting a prompt template based at least in part on the first account. The generative model (e.g., generative model 240 with respect to FIG. 2) may be selected and invoked by the generative model system (e.g., generative model system 782 with respect to FIG. 7) in response to the NL query. The first input may contain metadata identifying the first entity, a request for a prompt template that reflects the user's account and preferences, and any device context available at the time of the query. For example, the prompt template may specify the type of information to be populated, such as prior transaction history, preferred merchants, or reward categories.

At block 806, the method 800 may include generating request context metadata based at least in part on a similarity score associated with a first output of the generative model and historical data associated with the first account. By way of a non-limiting example, the first output may be generated by the generative model processing the first input, and the similarity score is produced by comparing the NL query to historical data associated with the first account. The request context metadata may be constructed by referencing a historical data store (e.g., historical data store 224 with respect to FIG. 2 or historical data store 724 with respect to FIG. 7) and includes parameters such as similarity scores, user preferences, previous resource object selections, and device context. For example, if the first entity frequently uses a particular credit card at hardware stores and has received high-value rewards, the similarity score for that resource object will be higher. The generative model system (e.g., generative model system 782 with respect to FIG. 7) may be responsible for processing the first input and calculating similarity scores using natural language processing and historical behavioral analysis.

At block 808, the method 800 may include providing the request context metadata and at least a portion of the NL query as a second input to the generative model in accordance with a prompt template. By way of a non-limiting example, the request context metadata includes historical data associated with the first account, and the historical data is populated in accordance with the prompt template. The generative model receives the second input containing the enriched metadata and the relevant portion of the NL query, allowing it to generate a more accurate and context-aware response. For example, the prompt template may request population of fields such as "recently used cards," "available offers," or "reward history," and the request context metadata is filled accordingly prior to submission. The adapter (e.g., adapter 220 with respect to FIG. 2) may act as an intermediary, compiling and formatting the data for the generative model.

At block 810, the method 800 may include selecting a set of interactable objects in accordance with a second output of the generative model. By way of a non-limiting example, the set of interactable objects are associated with a set of resource objects that facilitate access to the at least one transferrable resource, and the set of resource objects are associated with a set of offset resources. The second output is generated based at least in part on the generative model processing the second input. The selection process identifies which interactable objects (e.g., interactable objects 370 with respect to FIG. 3 or interactable objects 470 with respect to FIG. 4) should be presented within the GUI. Each interactable object is linked to a resource object (e.g., a particular credit card, device control, or content module) and associated offset resources (e.g., cashback rewards, promotional offers, or digital badges). The IOS (e.g., IOS 302 with respect to FIG. 3) may use device context, user preferences, and reward values to prioritize and filter the interactable objects, ensuring only the most relevant subset is selected for display.

At block 812, the method 800 may include receiving, from the edge device, a selection of an interactable object of the subset of interactable objects that is associated with a first interactable object of the subset of interactable objects. By way of a non-limiting example, the threshold condition is determined based at least in part on a determined usable area of the GUI. The method may further include determining a GUI parameter associated with the GUI of the edge device, generating a target GUI layout for the GUI of the edge device that includes a subset of interactable objects of the set of interactable objects in accordance with a threshold condition associated with the GUI parameter, and causing the GUI of the edge device to display the subset of interactable objects in accordance with the target GUI layout. Determining the GUI parameter may include determining at least one of an orientation of the edge device, a resolution of the edge device, a screen size of the edge device, or an accessibility setting of the edge device. Generating the target GUI layout for the GUI may include determining at least one of scaling, positioning, and arranging of the subset of interactable objects based at least in part on the GUI parameter. The method 800 may also include determining a physical location of the edge device, such that generating the target GUI layout is based at least in part on the physical location. For example, if the edge device (e.g., edge device 301 with respect to FIG. 3) is in portrait orientation and has accessibility settings enabled, the GUI generator system (e.g., GUI generator system 786 with respect to FIG. 7) may only display three interactable objects associated with a retailer at that physical location, each scaled for larger touch targets and clear labeling. The IOS may dynamically update the layout based on real-time context, ensuring usability and clarity regardless of device constraints or changes in user settings.

At block 814, the method 800 may include causing activation of a resource object of the set of resource objects associated with an offset resource based at least in part on the selection. By way of a non-limiting example, when the user selects an interactable object within the GUI (e.g., taps on the card offering the highest cashback), the IOS (e.g., IOS 302 with respect to FIG. 3) activates the corresponding resource object (e.g., a digital representation of the selected credit card) and applies the associated offset resource (e.g., enabling a cashback offer for the current transaction). The output manager (e.g., output manager 789 with respect to FIG. 7) may facilitate the activation process, update the user's account, and ensure the offset resource is provisioned according to the terms of the offer.

At block 816, the method 800 may include causing transfer of the at least one transferrable resource associated with the resource object from the first account associated with the first entity to a second account associated with a second entity. By way of a non-limiting example, following activation, the system may facilitate a secure transfer of the transferrable resource (e.g., the digital funds or payment credentials linked to the selected card) from the first account (e.g., first account 204 with respect to FIG. 2) to a second account (e.g., second account 256 of second entity 257 with respect to FIG. 2), such as a merchant, payment processor, or other recipient. The account system (e.g., account system 784 with respect to FIG. 7) may be responsible for handling account authentication, permissions, and transaction logging to ensure compliance and traceability.

At block 818, the method 800 may include applying the offset resource to the first account based at least in part on the activation. By way of a non-limiting example, upon successful transfer, the IOS (e.g., IOS 302 with respect to FIG. 3) applies the offset resource (e.g., cashback reward, bonus points, or digital badge) to the first account of the user, updating account records and providing confirmation via the GUI. The optimization system (e.g., optimization system 788 with respect to FIG. 7) may further track and analyze the application of offset resources for ongoing personalization and system improvement. For example, if the offset resource is a "$20 bonus for purchases over $100," the account is updated to reflect the earned bonus, and the user may receive a notification of the successful application and benefit received.

Example 1: Applying Offset Resources in Accordance with Activated Resource Objects By way of a non-limiting example, a first entity may use an edge device (e.g., edge device 201 with respect to FIG. 2), such as a smartphone, to determine which credit card should be used during a purchase in order to maximize cashback rewards or similar offset resources. The first entity interacts with a graphical user interface (e.g., GUI 208 with respect to FIG. 2) of an application (e.g., application 209 with respect to FIG. 2) that is installed or accessible on the edge device. The application is associated with a first account (e.g., first account 204 with respect to FIG. 2) that stores digital representations of the first entity's transferrable resources (e.g., multiple credit cards). When the first entity is at a retail checkout or completing an online transaction, they may want to quickly determine which credit card to use to obtain the best available cashback offer. The first entity launches the application and submits a NL query (e.g., NL query 103 submitted through API 252-1 with respect to FIG. 2). For example, the first entity may speak or type, "Which of my cards (e.g., credit, debit, etc.) gives the best cashback at this store?" or "What card should I use for groceries today?"

The NL query is received by the application (e.g., application 209 with respect to FIG. 2) and is relayed to a IOS (e.g., IOS 202 with respect to FIG. 2) via the API (e.g., API 252-1 with respect to FIG. 2). The IOS then forwards the NL query to an adapter (e.g., adapter 220 with respect to FIG. 2), which determines the most relevant generative model to process the query by referencing a generative model data store (e.g., generative model data store 222 with respect to FIG. 2). The adapter submits the NL query to the selected generative model (e.g., generative model 240 with respect to FIG. 2), which extracts intent, keywords such as "cashback," "groceries," or the merchant's name, and generates a populatable prompt for further contextual data enrichment. The adapter then queries a historical data store (e.g., historical data store 224 with respect to FIG. 2) to access records of prior credit card usage, past cashback rewards received, and patterns regarding which cards have previously been used for similar purchases. The adapter computes similarity scores between the current query and these historical records. For example, if the first entity has often used a particular credit card for grocery purchases and received substantial rewards, the similarity score for that resource object will be high.

The adapter then identifies a set of resource objects (e.g., resource objects 247 with respect to FIG. 2) representing the various credit cards (or suitable equivalent) available to the first entity. Each resource object is linked to one or more offset resources (e.g., offset resources 249 with respect to FIG. 2), which may include cashback percentages, limited-time promotional bonuses, or other rewards such as "5% cashback at supermarkets this quarter" or "$10 bonus for purchases over $50 at this merchant." Information about these offset resources is retrieved from an offset resource data store (e.g., offset resource data store 226 with respect to FIG. 2). The adapter may filter or prioritize the candidate resource objects according to a threshold condition, such as only presenting credit cards with at least 2% cashback or currently active bonus offers. The request context metadata, now including historical usage, similarity scores, resource object details, and offset resource values, is then submitted (along with any relevant portion of the NL query) to the generative model (e.g., generative model 240 with respect to FIG. 2) for further processing. The generative model returns a second output identifying the optimal subset of resource objects (e.g., resource objects 247 with respect to FIG. 2) and associated offset resources (e.g., offset resources 249 with respect to FIG. 2) to present.

This optimized data is returned to the IOS, which then determines GUI parameters for the edge device (e.g., screen orientation, resolution, physical size, and accessibility settings). For example, if the edge device is in portrait orientation with a moderate screen width, the GUI (e.g., GUI 208 with respect to FIG. 2) may select three interactable objects, each corresponding to a top-ranked credit card with its associated reward offer. The IOS applies a threshold condition that considers the edge device's viewport, touch target size, and other interface constraints, ensuring that the GUI is not overcrowded and that each interactable object may be clearly selectable even if the user is in a hurry. The target GUI layout is generated and the GUI (e.g., GUI 208 with respect to FIG. 2) displays the prioritized subset of interactable objects (e.g., the top three to five credit card options) to the first entity. Each interactable object visually communicates the expected offset resource, such as "5% cashback at groceries," "$10 bonus this month," or "Best offer for this store." The interactable objects are sorted so the card with the highest projected reward or most relevant bonus appears first, with others presented in order of decreasing benefit.

At checkout, the first entity is able to make a selection quickly from the presented options. For example, the first entity taps on the interactable object corresponding to the credit card resource object (e.g., resource object 259 with respect to FIG. 2) that offers the most advantageous offset resource (e.g., offset resource 258 with respect to FIG. 2), such as "5% cashback for groceries this quarter." This selection is received by the application and relayed to the IOS, which activates the selected resource object for a defined period (e.g., the current quarter or month, as specified by the card's offer terms). Activation of the resource object also activates the associated offset resource for the first entity. For example, if the selected credit card provides a quarterly bonus on specific purchases, the offset resource is provisioned for every eligible purchase made with that card during the activation interval. The application then records the selection and, when the purchase is completed, triggers a transfer of the transferrable resource (e.g., a cash value via use of the selected credit card) from the first account (e.g., first account 204 with respect to FIG. 2) to a second account (e.g., second account 256 of second entity 257 with respect to FIG. 2), which may represent the merchant or payment processor.

After the transaction, the IOS applies the offset resource (e.g., credits the earned cashback or applies the bonus) to the first account. All actions, including the NL query, similarity score computation, resource object selection, offset resource application, and GUI adaptation, are logged for future analysis and to refine future recommendations. Because the IOS presents only the relevant and/or highest-value resource objects based on the user's context and historical preferences, the first entity is able to select the optimal credit card rapidly at checkout without wasting time or holding up the line. Feedback on the desirability of the presented interactable objects may be solicited after the transaction, allowing the system to further improve future prioritizations. In this way, the process delivers a real-time, context-optimized, and user-centric solution for maximizing cashback rewards or similar offset resources during time-sensitive purchasing scenarios.

Example 2: Applying Offset Resources in Accordance with Various GUI Parameters By way of another non-limiting example, a first entity planning to make a purchase at a home hardware store may use an edge device (e.g., edge device 201 with respect to FIG. 2), such as a smartphone, to determine which of several available credit cards will yield the highest benefit in the form of cashback or other rewards. The first entity launches an application (e.g., application 209 with respect to FIG. 2) and interacts with its graphical user interface (e.g., GUI 208 with respect to FIG. 2). The application is associated with a first account (e.g., first account 204 with respect to FIG. 2) that stores the first entity's transferrable resources, namely, a set of credit cards. Upon arrival at the home hardware store, geofencing technology within the application detects that the first entity is physically located within the boundaries of a registered home improvement retailer (e.g., the application 209 may use GPS, Wi-Fi, or Bluetooth location APIs to verify presence within the geofenced region). This contextual information is appended to the first entity's next NL query (e.g., NL query 103 with respect to FIG. 2), for example: "Which card should I use here to get the best rewards on my purchase?"

The NL query 103, together with the geofencing context, is sent through the application program interface (e.g., API 252-1 with respect to FIG. 2) to an interaction optimization system (e.g., IOS 202 with respect to FIG. 2). The IOS 202 relays the query and context to an adapter (e.g., adapter 220 with respect to FIG. 2), which references a generative model data store (e.g., generative model data store 222 with respect to FIG. 2) to determine the most suitable generative model (e.g., generative model 240 with respect to FIG. 2). The adapter submits the NL query and context to the generative model 240, which parses the input for intent, keywords (e.g., "hardware store," "rewards," or "home improvement"), and constructs a populatable prompt. To personalize and optimize the response, the adapter queries a historical data store (e.g., historical data store 224 with respect to FIG. 2) for detailed records of the first entity's past credit card usage. The historical data may include, for each credit card resource object: the number of times each card was used at home improvement stores, the total amount spent, the rewards or cashback earned, the recency of such transactions, and patterns of reward redemption success. For example, the adapter may discover that the first entity most frequently used a particular credit card at hardware stores and consistently received a seasonal bonus, or that a different card recently introduced a promotional cashback offer for home improvement purchases.

The adapter 220 determines similarity scores between the current context (NL query and geofencing data) and historical usage records. Cards with a strong history of use at similar merchants or with high previous rewards for the same merchant category are assigned higher similarity scores. In addition, the adapter 220 retrieves the set of candidate resource objects (e.g., resource objects 247 with respect to FIG. 2) representing the first entity's available credit cards and queries an offset resource data store (e.g., offset resource data store 226 with respect to FIG. 2) for active offset resources (e.g., "10% cashback at home improvement stores this weekend" or "$20 bonus on hardware purchases over $100"). The request context metadata is constructed, capturing the historical card usage, similarity scores, geofencing information, resource object details, and offset resource values. This request context metadata, together with the relevant portion of the NL query, is submitted to the generative model 240 for further processing. The generative model 240 returns a second output, structured as an API object file (e.g., a JSON file), which specifies a ranked list of the top five resource objects (e.g., credit cards), their associated offset resources, and layout instructions for optimal display. For example, the JSON file may include:

```
{
  "gui_layout":
  "orientation": "portrait",
  "resolution": "1170x2532",
  "accessibility": {
  "font_size": "large",
  "contrast": "high"
  },
  "interactable_objects": [
  {
  "card_id": "cardA",
  "reward_label": "10% cashback at home improvement stores",
  "ranking": 1,
  "scale_factor": 1.2,
  "highlight": true
  },
  {
  "card_id": "cardB",
  "reward_label": "5% bonus, $20 over $100",
  "ranking": 2,
  "scale_factor": 1.1,
  "highlight": false
  },
  {
  "card_id": "cardC",
  "reward_label": "2% everyday cashback",
  "ranking": 5,
  "scale_factor": 1.0,
  "highlight": false
  },
  {
  "card_id": "cardD",
  "reward_label": "5% first-time use bonus",
  "ranking": 6,
  "scale_factor": 1.0,
  "highlight": false
  },
  {
  "card_id": "cardE",
  "reward_label": "3% online purchase cashback",
  "ranking": 7,
```

-continued

```
"scale_factor": 0.9,
"highlight": false
        }
    ]
    }
}
;
```

This example JSON file contains GUI layout parameters including orientation, resolution, accessibility settings (e.g., large font and high contrast for visually impaired users), and scaling instructions for each interactable object. The resource object with the highest predicted benefit, based on historical data and current geofenced context, is given a larger scale factor and may be visually highlighted in the GUI (e.g., cardA is scaled 20% larger and marked for highlight).

The IOS 202 receives the output and determines GUI parameters such as screen size, available viewport, and accessibility preferences. The GUI generator system dynamically interprets the JSON file and arranges the top five interactable objects (e.g., credit cards) within the GUI 208 (with respect to FIG. 2) so that the highest-ranked card appears first and is visually prominent. Scaling is applied to ensure that the most relevant card is easiest to select, while all interactable objects respect minimum size for touch targets, as well as accessibility constraints.

Because the first entity has enabled large text and high-contrast mode for accessibility, the GUI generator system further increases font sizes, enhances color contrast, and limits the number of interactable objects visible per page if necessary. If the edge device display in portrait orientation only allows three interactable objects to be comfortably visible, the remaining two are accessible via horizontal scrolling or a pagination control.

The first entity, now presented with a clear, visually distinct, and prioritized set of credit card options, quickly identifies the card labeled "10% cashback at home improvement stores" (cardA) as the optimal choice. The first entity taps this interactable object, triggering the activation of the corresponding resource object (e.g., resource object 247 with respect to FIG. 2) and the associated offset resource (e.g., offset resource 249 with respect to FIG. 2). This resource object activation is configured for the duration of the weekend, matching the terms of the offer. When the first entity completes the transaction at the hardware store, the IOS records the use of the selected credit card and applies the offset resource (e.g., the 10% cashback) to the first account (e.g., first account 204 with respect to FIG. 2). The transferrable resource (the payment using the selected card) is transferred to the merchant's account (e.g., second account 256 of second entity 257 with respect to FIG. 2). All actions are logged in the historical data store (e.g., historical data store 224 with respect to FIG. 2) so that future recommendations can further adapt to the first entity's preferences and behaviors.

Example 3: Applying Offset Resources in Accordance with Application Portal

By way of a non-limiting example, a first entity, such as a prospective or current credit card customer, accesses a credit card portal via an edge device (e.g., a smartphone or tablet) operating a GUI configured to interface with an IOS. Upon accessing the portal, the first entity is greeted by an interactive demo highlighting the portal's advanced features, including a natural language search bar powered by a generative model (e.g., Vertex AI or a comparable system, e.g., generative model 240 with respect to FIG. 2). The introductory page showcases a visually engaging and intuitive layout, encouraging the first entity to try out the generative model powered search functionality as part of the card application experience. Curious about the rewards program, the first entity types or speaks the query, "What is the estimated cashback if I use the credit card at SuperMart or at the local electronics retailer?" The system receives the NL query, which may be processed as described at block 802 of method 800 (see FIG. 8), and provides the query as input to the generative model. The generative model parses the query, references historical data and account context, and calculates estimated cashback for each retailer, factoring in both the standard rewards rate and any extra offers or bonus categories currently active for the credit card (e.g., "5% extra cashback at electronics stores this month"). The resulting interactable objects (e.g., interactable objects 370 with respect to FIG. 3) are displayed in the GUI, each clearly labeled with retailer names and projected cashback amounts, such as "SuperMart: $3.20 estimated cashback on a $64 purchase" or "Electronics World: $7.50 cashback with current Voice card bonus."

Throughout this process, the portal provides in-built customer education by surfacing interactive tips and explanations alongside the generative model results. For example, as the first entity adjusts hypothetical transaction amounts or switches between different retailers, the GUI dynamically updates the estimated rewards and displays context-sensitive tooltips, such as, "Did you know? Using your card in the electronics category this month earns an additional 3% cashback." This allows the customer to explore how changes in spend, merchant, or card selection directly impact their rewards, thereby deepening their understanding of how credit card categories, promotions, and base rates operate.

Seeking to further understand the financial implications of carrying a balance, the first entity asks, "How much interest would I pay if I only make minimum payments on my $572 balance at 8% APR?" The NL query is processed by the system, which retrieves current balance and rate information from the first entity's account data (e.g., first account 204 with respect to FIG. 2) and invokes the generative model to perform a real-time interest calculation. The resulting response is presented as a clear, actionable breakdown: "If you make only the minimum payment of 2% of your balance, you'll be charged approximately $3.81 in interest for the first month. If you continue to pay only the minimum, it could take about 2 years to pay off the balance, with total interest paid approaching $50." The GUI may also present a visual chart or interactive calculator, allowing the customer to experiment with different payment scenarios and observe the long-term accrual in real time to allow the first entity to make better financial decisions.

At any point, the first entity may elect to access additional educational content, such as a video tutorial or live chat with a financial advisor, by clicking a prominently displayed link (e.g., interactable link 481 with respect to FIG. 4). This tutorial may walk the customer through the mechanics of interest accrual, effective payment strategies, and how to maximize rewards while minimizing interest costs. These educational features are integrated into the portal, providing timely, personalized guidance based on the user's actions and queries. Th first entity may then decide to proceed with the credit card application (or activating an already owned credit card). The application page itself may feature an interactive demo of the generative model powered search, allowing the applicant to "try before they buy" by exploring potential rewards and benefits prior to submitting the application.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are suscep- tible to various modifications and alternative constructions, certain illustrated embodiments thereof are shown in the drawings and have been described above in detail. It should be understood, however, that there is no intention to limit the disclosure to the specific form or forms disclosed. On the contrary, the intention is to cover all modifications, alterna- tive constructions, and equivalents falling within the spirit and scope of the disclosure, as defined in the appended claims.

The use of the terms "a" and "an" and "the" and similar referents in the context of describing the disclosed embodi- ments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless oth- erwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order, unless otherwise indicated herein or otherwise clearly contradicted by context. The use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non- claimed element as essential to the practice of the disclosure.

As used herein, the term "resource object" may refer to any digital, virtual, or physical representation of an entity, item, credential, or access token that may be selected, activated, or otherwise interacted with by a user or system component within the scope of the present disclosure. Resource objects may include, without limitation, credit/ debit cards, digital keys, account profiles, device controls, content modules, or other selectable or actionable items. For example, a resource object may represent a specific credit card available to a user, a digital badge that can be earned, a smart home device that can be controlled, or a profile containing access permissions. Resource objects may be associated with one or more offset resources, data attributes, or activation conditions, and may be stored, retrieved, or rendered by system components such as an interaction optimization system (IOS) or graphical user interface (GUI). The foregoing description of resource objects is provided for illustrative purposes only and is not intended to be limiting. Other types of resource objects, formats, or implementations may be utilized within the scope of the present disclosure.

As used herein, the term "offset resource" may refer to any benefit, reward, enhancement, or additional value that is associated with a resource object and may be applied, accrued, or activated as a result of user interaction, selection, or system processing. Offset resources may include, without limitation, cashback rewards, promotional bonuses, loyalty points, digital badges, extended access rights, feature unlocks, or time-limited offers. For example, an offset resource may comprise a "5% cashback" benefit associated with a particular credit card resource object, a "$20 bonus" offered for purchases over a certain threshold, or a digital badge awarded for completing a task within an application. Offset resources may be dynamically determined, calculated based on historical data, or provided in response to contex- tual triggers such as location, time, or user behavior. The foregoing description of offset resources is not intended to be limiting, and offset resources may include any type of value, reward, or enhancement suitable for use in the dis- closed system or its variants.

As used herein, the term "request context metadata" may refer to any collection of data, attributes, scores, or contex- tual information that is generated, assembled, or referenced in connection with processing a user request or natural language (NL) query within the disclosed system. Request context metadata may include, without limitation, similarity scores comparing the current query to historical data, user preferences, device parameters, geolocation information, session state, selected resource objects, previously accrued offset resources, or behavioral patterns. For example, request context metadata may comprise a similarity score indicating how closely a current NL query matches previous user actions, a record of which resource objects have been frequently selected, or metadata reflecting the current device orientation and accessibility settings. Request context meta- data may be used by the interaction optimization system (IOS) or generative models to personalize, prioritize, and refine the presentation of interactable objects or the activa- tion of offset resources. The foregoing description of request context metadata is provided for illustration and does not limit the scope of the term, which may encompass any relevant contextual, historical, or operational data utilized by the system.

As used herein, the term "interactable object" may refer to any graphical, digital, or physical element that may be presented within a graphical user interface (GUI) and is operable to be selected, activated, or otherwise manipulated by a user or system component. Interactable objects may include, without limitation, buttons, icons, cards, list entries, menu items, switches, or any visual representation of a resource object or offset resource. For example, an inter- actable object may comprise a graphical card representing a specific credit card option, a button labeled with a promo- tional offer, a list entry for a smart home device, or an icon indicating a user achievement. Interactable objects may be dynamically generated and arranged based on user context, device parameters, historical data, or system recommenda- tions, and may be visually distinguished by ranking, high- lighting, scaling, or metadata. The foregoing description of interactable objects is illustrative in nature and is not intended to be limiting. Any suitable interactive element, representation, or mechanism may be used within the scope of the present disclosure.

Where terms are used without explicit definition as recited herein, it is understood that the ordinary meaning of the word is intended, unless a term carries a special meaning in the field of anomaly detection or other relevant fields. The terms "about," "substantially", "similar to", "similar", or "approximately" are used to indicate a deviation from the stated property or numerical value within which the devia- tion has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (i.e., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
   receiving, from an edge device including graphical user interface (GUI), a natural language (NL) query associated with a first entity, wherein the edge device is associated with a first account of the first entity that contains at least one transferrable resource;
   providing the NL query as a first input to a generative model, wherein the first input includes instructions requesting a prompt template based at least in part on the first account;
   generating request context metadata based at least in part on a similarity score associated with a first output of the generative model and historical data associated with the first account, wherein the first output is based at least in part on the generative model processing the first input;
   providing the request context metadata and at least a portion of the NL query as a second input to the generative model in accordance with the prompt template;
   selecting a set of interactable objects in accordance with a second output of the generative model, wherein the set of interactable objects are associated with a set of resource objects that facilitate access to the at least one transferrable resource, and the set of resource objects are associated with a set of offset resources, and wherein the second output is based at least in part on the generative model processing the second input;
   receiving, from the edge device, a selection of an interactable object of the set of interactable objects;

causing activation of a resource object of the set of resource objects associated with an offset resource based at least in part on the selection;
   causing transfer of the at least one transferrable resource associated with the resource object from the first account associated with the first entity to a second account associated with a second entity; and
   applying the offset resource to the first account based at least in part on the activation.

2. The computer-implemented method of claim 1, wherein the request context metadata includes historical data associated with the first account, and wherein the historical data is populated in accordance with the prompt template.

3. The computer-implemented method of claim 1, further comprising:
   determining a GUI parameter associated with the GUI of the edge device;
   generating a target GUI layout for the GUI of the edge device that includes a subset of interactable objects of the set of interactable objects in accordance with a threshold condition associated with the GUI parameter; and
   causing the GUI of the edge device to display the subset of interactable objects in accordance with the target GUI layout, wherein determining the GUI parameter includes determining at least one of an orientation of the edge device, a resolution of the edge device, a screen size of the edge device, or an accessibility setting of the edge device.

4. The computer-implemented method of claim 3, wherein generating the target GUI layout for the GUI includes determining at least one of scaling, positioning, and arranging of the subset of interactable objects based at least in part on the GUI parameter.

5. The computer-implemented method of claim 3, further comprising:
   determining a physical location of the edge device, wherein generating the target GUI layout is based at least in part on the physical location.

6. The computer-implemented method of claim 3, wherein the threshold condition is determined based at least in part on a determined usable area of the GUI.

7. The computer-implemented method of claim 1, wherein the similarity score is generated based at least in part on comparing the NL query to historical data associated with the first account.

8. A computing device, comprising:
   one or more processors; and
   one or more memories storing computer-executable instructions that, when executed by the one or more processors, causes the one or more processors to:
   receive, from an edge device including graphical user interface (GUI), a natural language (NL) query associated with a first entity, wherein the edge device is associated with a first account of the first entity that contains at least one transferrable resource;
   provide the NL query as a first input to a generative model, wherein the first input includes instructions requesting a prompt template based at least in part on the first account;
   generate request context metadata based at least in part on a similarity score associated with a first output of the generative model and historical data associated with the first account, wherein the first output is based at least in part on the generative model processing the first input;

provide the request context metadata and at least a portion of the NL query as a second input to the generative model in accordance with the prompt template;

select a set of interactable objects in accordance with a second output of the generative model, wherein the set of interactable objects are associated with a set of resource objects that facilitate access to the at least one transferrable resource, and the set of resource objects are associated with a set of offset resources, and wherein the second output is based at least in part on the generative model processing the second input;

receive, from the edge device, a selection of an interactable object of the set of interactable objects;

cause activation of a resource object of the set of resource objects associated with an offset resource based at least in part on the selection;

cause transfer of the at least one transferrable resource associated with the resource object from the first account associated with the first entity to a second account associated with a second entity; and apply the offset resource to the first account based at least in part on the activation.

9. The computing device of claim 8, wherein the request context metadata includes historical data associated with the first account, and wherein the historical data is populated in accordance with the prompt template.

10. The computing device of claim 9, wherein the instructions further cause the one or more processors to:

determine a GUI parameter associated with the GUI of the edge device;

generate a target GUI layout for the GUI of the edge device that includes a subset of interactable objects of the set of interactable objects in accordance with a threshold condition associated with the GUI parameter; and cause the GUI of the edge device to display the subset of interactable objects in accordance with the target GUI layout, wherein determining the GUI parameter includes determining at least one of an orientation of the edge device, a resolution of the edge device, a screen size of the edge device, or an accessibility setting of the edge device.

11. The computing device of claim 10, wherein generating the target GUI layout for the GUI includes determining at least one of scaling, positioning, and arranging of the subset of interactable objects based at least in part on the GUI parameter.

12. The computing device of claim 10, wherein the instructions further cause the one or more processors to:

determine a physical location of the edge device, wherein generating the target GUI layout is based at least in part on the physical location.

13. The computing device of claim 10, wherein the threshold condition is determined based at least in part on a determined usable area of the GUI.

14. The computing device of claim 9, wherein the similarity score is generated based at least in part on comparing the NL query to historical data associated with the first account.

15. A non-transitory computer-readable storage medium storing computer-executable instructions that, when executed with one or more processors of a computing device, causes the one or more processors to:

receive, from an edge device including graphical user interface (GUI), a natural language (NL) query associated with a first entity, wherein the edge device is associated with a first account of the first entity that contains at least one transferrable resource;

provide the NL query as a first input to a generative model, wherein the first input includes instructions requesting a prompt template based at least in part on the first account;

generate request context metadata based at least in part on a similarity score associated with a first output of the generative model and historical data associated with the first account, wherein the first output is based at least in part on the generative model processing the first input;

provide the request context metadata and at least a portion of the NL query as a second input to the generative model in accordance with the prompt template;

select a set of interactable objects in accordance with a second output of the generative model, wherein the set of interactable objects are associated with a set of resource objects that facilitate access to the at least one transferrable resource, and the set of resource objects are associated with a set of offset resources, and wherein the second output is based at least in part on the generative model processing the second input;

receiving, from the edge device, a selection of an interactable object of the set of interactable objects;

cause activation of a resource object of the set of resource objects associated with an offset resource based at least in part on the selection;

cause transfer of the at least one transferrable resource associated with the resource object from the first account associated with the first entity to a second account associated with a second entity; and apply the offset resource to the first account based at least in part on the activation.

16. The non-transitory computer-readable storage medium of claim 15, wherein the request context metadata includes historical data associated with the first account, and wherein the historical data is populated in accordance with the prompt template.

17. The non-transitory computer-readable storage medium of claim 16, wherein the instructions further cause the one or more processors to:

determine a GUI parameter associated with the GUI of the edge device;

generate a target GUI layout for the GUI of the edge device that includes a subset of interactable objects of the set of interactable objects in accordance with a threshold condition associated with the GUI parameter; and cause the GUI of the edge device to display the subset of interactable objects in accordance with the target GUI layout, wherein determining the GUI parameter includes determining at least one of an orientation of the edge device, a resolution of the edge device, a screen size of the edge device, or an accessibility setting of the edge device.

18. The non-transitory computer-readable storage medium of claim 17, wherein generating the target GUI layout for the GUI includes determining at least one of scaling, positioning, and arranging of the subset of interactable objects based at least in part on the GUI parameter.

19. The non-transitory computer-readable storage medium of claim 17, wherein the instructions further cause the one or more processors to:

determine a physical location of the edge device, wherein generating the target GUI layout is based at least in part on the physical location.

20. The non-transitory computer-readable storage medium of claim 16, wherein the similarity score is generated based at least in part on comparing the NL query to historical data associated with the first account.

\* \* \* \* \*